United States Patent
Ohkubo et al.

[11] Patent Number: 5,959,965
[45] Date of Patent: Sep. 28, 1999

[54] DIGITAL BROADCASTING RECEIVER

[75] Inventors: Tadatoshi Ohkubo; Kenichi Taura; Masahiro Tsujishita; Yoshiharu Ohsuga, all of Tokyo, Japan

[73] Assignee: Mitsubishi Denki Kabushiki Kaisha, Tokyo, Japan

[21] Appl. No.: 08/840,724

[22] Filed: Apr. 25, 1997

[30] Foreign Application Priority Data

May 17, 1996 [JP] Japan ................................. 8-123408

[51] Int. Cl.⁶ .................................................. H04J 11/00
[52] U.S. Cl. .......................... 370/203; 370/210; 370/320
[58] Field of Search .................................. 370/206, 208, 370/203, 210, 211, 450, 481, 482, 215, 320, 478, 484; 375/362, 260, 200, 316; 455/42, 59

[56] References Cited

U.S. PATENT DOCUMENTS

| | | | |
|---|---|---|---|
| 5,191,576 | 3/1993 | Pomier et al. | 370/208 |
| 5,228,025 | 7/1993 | Le Floch et al. | 370/206 |
| 5,371,761 | 12/1994 | Daffara et al. | 375/1 |
| 5,506,836 | 4/1996 | Ikeda et al. | 370/203 |
| 5,550,812 | 8/1996 | Philips | 370/203 |

FOREIGN PATENT DOCUMENTS

| | | | |
|---|---|---|---|
| 529421A2 | 8/1992 | European Pat. Off. | H04L 5/06 |
| 0653858A2 | 5/1995 | European Pat. Off. | H04L 5/06 |
| 0656706A2 | 6/1995 | European Pat. Off. | H04L 5/06 |
| 22278257 | 11/1994 | United Kingdom | H04B 1/12 |
| WO95/19671 | 7/1995 | WIPO | H04L 5/06 |

OTHER PUBLICATIONS

Kammeyer; Nachrichtenübertragung. Stuttgart: Teubner, 1992, pp. 593–605, pp. 611–613.

*Primary Examiner*—Douglas W. Olms
*Assistant Examiner*—Shick Hom

[57] ABSTRACT

It is an object to correct a frequency deviation at the time of reception of a digital signal in which each carrier is subjected to phase modulation and orthogonal frequency division multiplexing (OFDM). A vector of fixed pattern symbols for reference of received carriers is multiplied by a vector of conjugate complex numbers of the defined values for each element. In the result, elements separated by the same numbers forward and backward from an element at a particular carrier frequency are multiplied together and the results are added. The same processing is applied to cases in which the elements of the vectors are mutually shifted by a plurality of elements from a certain correspondence and synchronization control to the broadcasting frequency is provided on the basis of a value which maximizes the absolute value in the results of the addition and the correspondence at that time.

19 Claims, 12 Drawing Sheets

DIGITAL BROADCASTING RECEIVER

BACKGROUND OF THE INVENTION

1. Field of the Invention

The present invention relates to a digital broadcasting receiver adapted for digital broadcasting systems in which a synchronizing signal with fixed pattern is transmitted in a frame with each carrier subjected to phase modulation (PSK) and orthogonal frequency division multiplexing (OFDM).

2. Description of the Background Art

As shown in FIG. 12, in an orthogonal frequency division multiplexing (OFDM) digital broadcasting system with phase modulated (PSK) carriers, an OFDM signal in the RF frequency band inputted from the antenna 1 is amplified in the RF amplifier 2, multiplied by a signal outputted from the voltage-controlled oscillator 10 in the mixer 3 to be downconverted into an intermediate frequency (IF) signal, bandwidth-limited and amplified to an appropriate signal level in the IF amplifier 4, quadrature demodulated in the quadrature demodulator 5, and then the I (in-phase) signal component and the Q (quadrature) signal component in the baseband frequency band are inputted to the A/D converter 6. The signals of the I component and the Q component converted into digital data in the A/D converter 6 are inputted to the symbol selector 15 and partitioned for each symbol, inputted to the FFT processor 7 and converted into complex number data in the frequency domain, inputted to the differential demodulator 20 and differentially demodulated, inputted to the error corrector 8, and then the error-corrected data is outputted to the digital output terminal 9.

In the OFDM signal with phase-modulated carriers, if the frequency downconverted by the mixer 3 is ideal, phase data of the individual carriers outputted from the FFT processor 5 concentrate at some particular phase points (for example, the four points: 0, $\pi/2$, $\pi$, $-\pi/2$ in the quadrature PSK (QPSK)). When the frequency downconverted by the mixer 3 is shifted from an ideal value, phase data of the carriers outputted from the FFT processor 7 appear while being shifted from the original phase points.

Accordingly, the data outputted from the FFT processor 7 and differential-demodulated in the differential demodulator 20 are inputted to the phase error detector 31. The phase error detector 31 calculates a deviation of phase (a phase error) of each carrier from the original phase point and the phase error is inputted to the frequency deviation detector 14. The frequency deviation detector 14 controls the oscillation frequency of the voltage-controlled oscillator 10 to reduce the phase error and thus the center frequency of the IF signal downconverted by the mixer 3 approaches the ideal value. More specifically, in the case where each carrier is modulated by QPSK with the four phase points, 0, $\pi/2$, $\pi$, $-\pi/2$, values obtained by raising data of the carriers outputted from the FFT processor 7 to the fourth power ideally all provide phase of 0 (actually, multiples of $2\pi$). Accordingly, a summation of all results obtained by raising to the fourth power is regarded as a phase error. The frequency deviation detector 14 controls the oscillation frequency of the voltage-controlled oscillator 10 by using the phase error and the signal outputted from the voltage-control oscillator 10 is inputted to the mixer 3, thus determining the center frequency of the IF signal outputted from the mixer 3.

In the case of the QPSK, however, when the frequency downconverted by the mixer 3 is deviated from the ideal value, the phase data of each carrier outputted from the FFT processor 7 may appear while being deviated from the original phase point by about $\pi/2$. In this case, when data of each carrier outputted from the FFT processor 7 are raised to the fourth power, phases of these values are all approximately 0 (actually, multiples of $2\pi$). Then, the deviation of the frequency downconverted by the mixer 3 can not be corrected by controlling the oscillation frequency of the voltage-controlled oscillator 10 by using the value of summation of all the results. The same is true when phase data of each carrier is shifted by $-\pi/2$ or $\pm\pi$ from an original phase point. Similarly, a frequency deviation equal to or greater than the carrier frequency interval of OFDM can not be corrected, either.

SUMMARY OF THE INVENTION

A first aspect of the present invention is directed to a digital broadcasting receiver for receiving digital broadcasting which uses orthogonal frequency division multiplexing transmission system in which each of a plurality of carriers is phase-modulated. According to the present invention, the digital broadcasting receiver comprises: FFT processing means for converting an orthogonal frequency division multiplexing signal expressed in the time domain, which is a digital signal obtained by reception, into demodulation data expressed in the frequency domain; and frequency deviation detecting operation means for obtaining a solution of operation of obtaining a vector by multiplying, for each element, a vector of demodulation data which the FFT processing means obtained by converting phase reference symbols of individual carriers by a vector of defined conjugate complex numbers of phase reference symbols held in advance in the digital broadcasting receiver, multiplying elements in a vector obtained by the former multiplication separated by the same numbers forward and backward from an element at a particular carrier frequency as a center, and adding results of the latter multiplication; wherein in solutions obtained by the frequency deviation detecting operation means for a correspondence in a particular relation between the vector of demodulation data of phase reference symbols outputted from the FFT processing means and the vector of defined conjugate complex numbers of phase reference symbols and correspondences in which elements of the vectors of demodulation data of phase reference symbols outputted and of defined conjugate complex numbers of phase reference symbols are in relations mutually shifted from the particular relation by a plurality of elements, a correspondence which provides a maximum absolute value is obtained, and synchronization control with respect to broadcasting frequency is provided on the basis of a difference of an obtained correspondence from the particular relation and the carrier frequency for the element used as the center in processings by the frequency deviation detecting operation means.

According to a second aspect of the present invention, a digital broadcasting receiver for receiving digital broadcasting which uses orthogonal frequency division multiplexing transmission system in which each of a plurality of carriers is phase-modulated comprises: symbol selecting means for partitioning a digital signal represented in the time domain obtained by reception into symbols; region converting processing means for obtaining demodulation data represented in the frequency domain by using the symbols partitioned by the symbol selecting means; phase correcting means for performing processing of multiplying, for each element, a vector of demodulation data of phase reference symbols outputted from the region converting processing means by a vector of defined conjugate complex numbers of phase reference symbols held in advance in the receiver; inverse FFT processing means for applying inverse FFT processing to an output of the phase correcting means; timing jitter detecting means for detecting a peak of a result of a processing of the inverse FFT processing means and detecting a shift in timing at which the symbol selecting means partitions symbols according to a position of the peak; timing control means for controlling timing at which the symbol selecting means partitions symbols according to a shift of timing; and product-sum operation means for multiplying elements separated by the same numbers forward and backward from an element at a particular carrier frequency as a center in an output vector of the phase correcting means and adding the results; wherein the phase correcting means provides, to the inverse FFT processing means, an output based on a correspondence between the vector of demodulation data of phase reference symbols and the vector of defined conjugate complex numbers of phase reference symbols which provides a maximum absolute value in solutions provided as a result of processings by the phase correcting means and the product-sum operation means for a correspondence in a particular relation and correspondences in which elements of the vectors of demodulation data of phase reference symbols outputted and of defined conjugate complex numbers of phase reference symbols are in relations mutually shifted from the particular relation by a plurality of elements.

According to a third aspect of the present invention, a digital broadcasting receiver for receiving digital broadcasting which uses orthogonal frequency division multiplexing transmission system in which each of a plurality of carriers is phase-modulated comprises: FFT processing means for converting an orthogonal frequency division multiplexing signal expressed in the time domain, which is a digital signal obtained by reception, into demodulation data expressed in the frequency domain; phase correcting means for multiplying, for each element, a vector of demodulation data of phase reference symbols outputted from the FFT processing means by a vector of defined conjugate complex numbers of phase reference symbols; product-sum operation means for multiplying elements separated by the same numbers forward and backward from an element at a particular carrier frequency as a center in an output vector of the phase correcting means and adding results of multiplicationof the product-sum operation means; carrier shift means for shifting correspondence between elements of the vector of demodulation data outputted from the FFT processing means and carrier frequencies; and control means for controlling the carrier shift means, wherein processings of the phase correcting means and the product-sum operation means are performed for a case in which a correspondence between the vector of demodulation data of phase reference symbols outputted from the FFT processing means and the vector of defined conjugate complex numbers of phase reference symbols is in a particular relation and cases in which elements of the vectors of demodulation data of phase reference symbols outputted and of defined conjugate complex numbers of phase reference symbols are in relations mutually shifted from the particular relation by a plurality of elements, a correspondence which provides a maximum absolute value is obtained in results of the processings, and the control means controls the carrier shift means on the basis of a difference of an obtained correspondence from the particular relation and the carrier frequency for the element used as the center by the product-sum operation means.

Preferably, according to a fourth aspect of the present invention, in any of the first to third aspects, the synchronization control to the broadcasting frequency is also based on a phase given by the product-sum operation result which maximizes the absolute value.

Preferably, according to a fifth aspect of the present invention, the digital broadcasting receiver according to the first or second aspect further comprises differential demodulation means for obtaining, for each carrier, a phase difference between demodulation data outputted from the FFT processing means and the preceding demodulation data, and phase error detecting means for multiplying a result of differential demodulation for each carrier outputted from the differential demodulation means by itself for the number of times corresponding to the number of phases of phase modulation on a transmitting side and obtaining the average, wherein the synchronization control to the broadcasting frequency is also based on an output of the phase error detecting means.

Preferably, according to a sixth aspect, in the digital broadcasting receiver according to the first or second aspect, the frequency deviation detecting operation means obtains vectors by multiplying, for each element, the vector of demodulation data of phase reference symbols outputted from the FFT processing means by the vector of defined conjugate complex numbers of phase reference symbols, multiplies elements in the vectors obtained by the former multiplication separated by the same numbers forward and backward from an element, as a center, corresponding to a baseband frequency of zero of the orthogonal frequency division multiplexing signal, adds results of the latter multiplication, and obtains a correspondence which provides a maximum absolute value in solutions of the addition.

Preferably, according to a seventh aspect of the present invention, in the digital broadcasting receiver of the first or second aspect, the frequency deviation detecting operation means uses limited parts of the vector of demodulation data of phase reference symbols outputted from the FFT processing means and the vector of defined conjugate complex numbers of phase reference symbols.

Preferably, according to an eighth aspect of the present invention, the digital broadcasting receiver of the first aspect comprises integrating means for multiplying elements separated by the same numbers forward and backward from an element at a particular carrier frequency as a center in the vector of demodulation data of phase reference symbols outputted from the FFT processing means, phase correcting operation means for multiplying, for each element, a vector resulting from the multiplication by the integrating means by each of vectors obtained by multiplying elements separated by the same numbers forward and backward from the element at the particular carrier frequency and elements separated by a plurality of elements from that element at the particular carrier frequency in the vector of defined conjugate complex numbers of phase reference symbols, and adding means for adding results of each of vectors outputted from the phase correcting operation means.

According to the digital broadcasting receiver of the first aspect, if a shift occurs in the synchronization frequency when frequency-down-converting a received signal, phase correction and product-sum operation processings are applied to the correspondence between a vector of demodulation data of phase reference symbols outputted from the FFT processing means and a vector of defined conjugate complex numbers of phase reference symbols for a particular relation and relations in which elements of the vectors are mutually shifted from the particular relation by a plurality of elements and then the results for the correspondences provide a maximum absolute value in a relation shifted from the particular relation in accordance with the frequency deviation. Then synchronization control is made so that the results of the operation gives the maximum absolute value in the particular correspondence.

This allows a shift in the synchronization frequency at the time of frequency-down-converting the received signal to be detected and automatically corrected with accuracy corresponding to the carrier frequency interval(s).

Furthermore, the detection and correction of the shift in the synchronization frequency with the accuracy corresponding to the carrier frequency interval(s) can be made not by timing jitter in partitioning the received signal into symbols.

According to the digital broadcasting receiver of the second aspect, when a certain degree of shift is caused in the partitioning timing by the symbol selecting means when it provides output to the FFT processing means, phase correction and inverse FFT processing are performed with the most appropriate correspondence selected from correspondences between the vector of demodulation data of phase reference symbols outputted from the FFT processing means and the vector of defined conjugate complex numbers of phase reference symbols, and the timing jitter in partitioning symbols is detected and corrected on the basis of the position of an element at which a peak appears in the vector produced by the inverse FFT processing which changes according to the timing jitter. Even when a certain degree of timing jitter occurs in the timing of partitioning input symbols to the FFT processing means, the process of correcting the timing jitter can be appropriately skipped.

This allows the timing jitter when partitioning a received signal into symbols to be detected and automatically corrected.

According to the digital broadcasting receiver of the third aspect, when a frequency deviation equal to or larger than the carrier frequency interval occurs in the synchronization frequency when frequency-down-converting the received signal, the correspondence between elements of the vector obtained by applying the FFT processing to the vector of the received OFDM signal in the time domain and the carrier frequencies is shifted for the carrier frequency closest to the shift.

When a frequency deviation equal to or larger than the carrier frequency interval occurs in the synchronization frequency when frequency-down-converting the received signal, shifting the correspondence between elements of the vector resulting from the FFT processing to the vector of the received OFDM signal in the time domain and the carrier frequencies for the carrier frequency closest to the shift reduces the amount of control to the oscillation frequency of the oscillator used for down converting.

According to the digital broadcasting receiver of the fourth aspect, if a shift occurs in the synchronization frequency when frequency-down-converting a received signal, phase correction and product-sum operation processing are applied to the correspondence between the vector of demodulation data of phase reference symbols outputted from the FFT processing means and the vector of defined conjugate complex numbers of phase reference symbols for a particular relation and relations in which elements of the vectors are mutually shifted from the particular relation by a plurality of elements and then the phase given by the value providing a maximum absolute value in the operation results for the correspondences changes according to the frequency deviation and the carrier frequency for the element used as the center in the product-sum operation. Then synchronization control is performed so that the phase given by the value providing the maximum absolute value in the operation results indicates a frequency deviation of zero.

This allows a shift in the synchronization frequency when frequency-down-converting the received signal to be detected and to be automatically corrected with accuracy corresponding to the carrier frequency interval(s) and with accuracy smaller than the carrier frequency interval.

According to the digital broadcasting receiver of the fifth aspect, when a shift occurs in the synchronization frequency when frequency-down-converting the received signal, each element in the vector resulting from differential demodulation of the received OFDM signal in the frequency domain is multiplied by itself for the number of times corresponding to the number of phases of phase modulation (for example, it is raised to the fourth power when each carrier is quadrature-phase-modulated) and the average is obtained, and thus the frequency deviation smaller than the carrier frequency interval can be obtained not by phase reference symbols. At the same time, the correspondence between the vector of demodulation data of phase reference symbols outputted from the FFT processing means and the vector of defined conjugate complex numbers of phase reference symbols are subjected to phase correction and product-sum operation for a particular relation and relations in which elements of the vectors are mutually shifted from the particular relation by a plurality of elements to obtain the frequency deviation by the phase reference symbols. And then the synchronization control is provided.

Accordingly, the synchronization frequency deviation can be detected and corrected when frequency-down-converting the received signal in other than positions of the phase reference symbols, which enables precise synchronization control.

According to the digital broadcasting receiver of the sixth aspect, when an element corresponding to the baseband frequency of zero of the OFDM signal in the output vector of the phase correcting means is regarded as the center, the phase given by the value which provides a maximum absolute value in the product-sum operation results for the individual relations changes according to the frequency deviation. Accordingly, synchronization control is made so that the phase given by the value providing a maximum absolute value in the operation results indicates a frequency deviation of zero.

Using the element corresponding to the baseband frequency of zero of the OFDM signal in the output vector from the phase correcting means as the center eliminates effect of timing jitter in the partitioning timing caused when partitioning the received continuous signal in the time domain and providing the vector of partitioned symbols to the FFT processing means. This simplifies detection and correction of the frequency deviation. The processing of correcting timing jitter in input data to the FFT processing means can be properly omitted.

According to the digital broadcasting receiver of the seventh aspect, the phase correction and product-sum operation are applied to correspondences between part of the vector of demodulation data of phase reference symbols outputted from the FFT processing means and part of the vector of defined conjugate complex numbers of phase reference symbols for a particular relation and relations in which the elements in the vectors are mutually shifted from the particular relation by a plurality of elements and synchronization control is provided according to a value giving a maximum absolute value in the results of the operation for the individual relations.

Thus using a partial vector of demodulation data of phase reference symbols outputted from the FFT processing means and a partial vector of defined conjugate complex numbers of phase reference symbols lessens the amount of calculation for detecting a frequency deviation at reception.

According to the digital broadcasting receiver of the eighth aspect, elements separated by the same numbers forward and backward from an element at a particular carrier frequency as a center are multiplied together in the vector of phase reference symbols outputted from the FFT processing means. Also, elements separated by the same numbers forward and backward from the element at the particular carrier frequency and an element separated from that element by a plurality of elements are multiplied in the vector of defined conjugate complex numbers of phase reference symbols to obtain vectors. Then product-sum operation is applied to each of the vectors and the vector obtained by multiplying the received symbols and synchronization control is provided according to a result providing a maximum absolute value.

Thus, multiplying elements separated by the same numbers forward and backward from an element at a particular carrier frequency as the center in the vector of phase reference symbols outputted from the FFT processing means and then applying product-sum operation to the correspondences between the vector resulting from the multiplication and the vectors obtained by multiplying elements separated by the same numbers forward and backward from the element at the particular carrier frequency together in the vector of defined conjugate complex numbers of phase reference symbols for a particular relation and relations in which elements of the vectors are mutually shifted by a plurality of elements from the particular relation lessens the amount of calculation for detecting a frequency deviation at the time of reception.

It is an object of the invention to provide a device which detects and automatically corrects a frequency deviation caused when a received signal is frequency-down-converted in a receiver for OFDM signal in which each carrier is PSK modulated These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
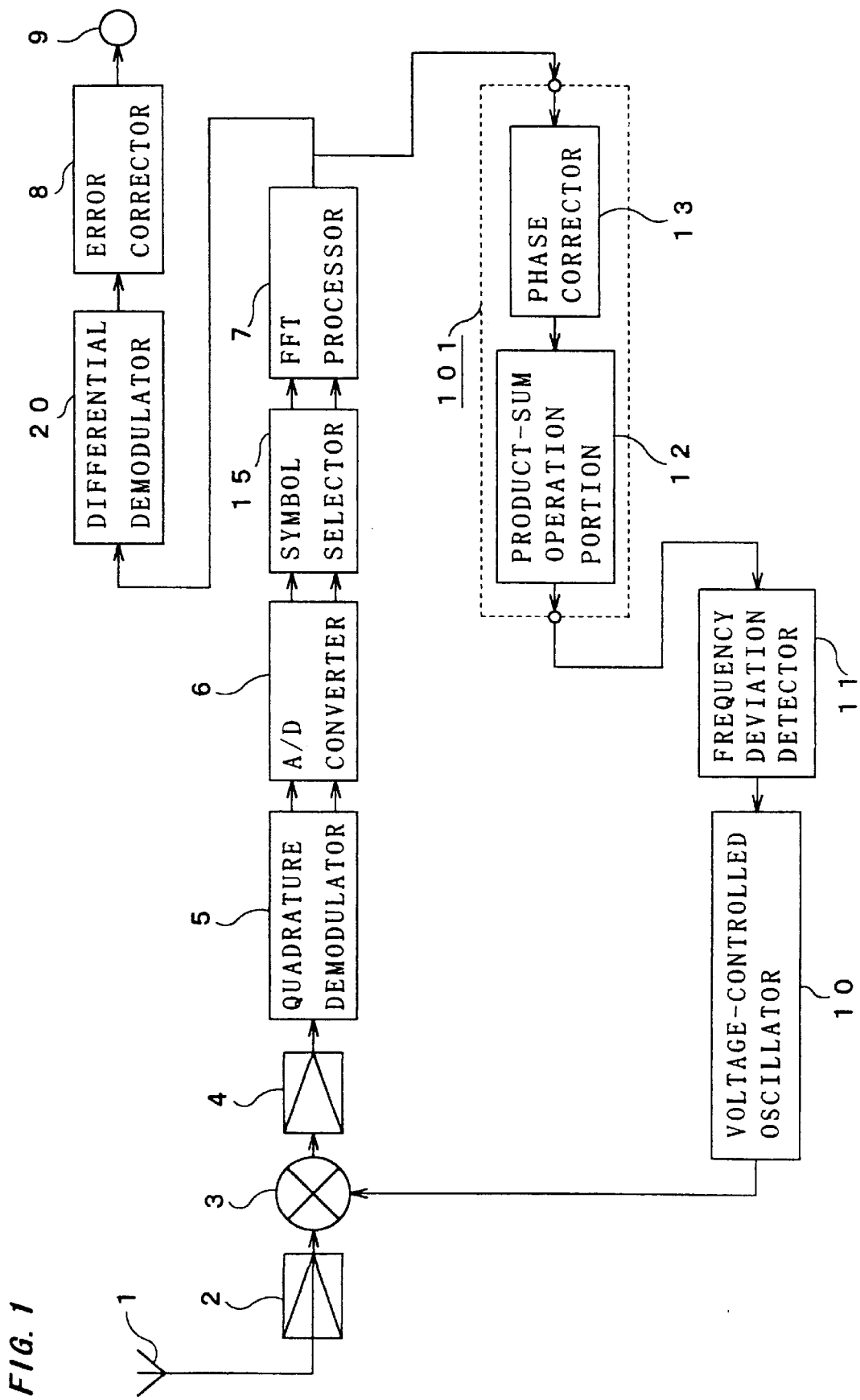
FIG. 1 is a block diagram showing the structure of a digital broadcasting receiver according to a first preferred embodiment of the present invention.

In the OFDM digital broadcasting in which each carrier is subjected to Quadrature Phase Shift Keying (QPSK), data are continuously transmitted in frames constituted by a certain format in appropriate time units. One frame of signal of baseband, s(t), on the broadcasting side is given by the equation (1) below:

$$s(t) = \sum_{l=0}^{L-1} \sum_{k=-\frac{K}{2}}^{\frac{K}{2}} Z_{l,k} b(t - lT_S) e^{2j\pi k F_S(t-lT_S)} \quad (1)$$

Where the number of carriers of OFDM is K+1, the carrier frequency interval is $F_s$, the length of one symbol is $T_s = 1/F_s$, the number of symbols in one frame is L, and b(t) is given as:

$$b(t) = \begin{cases} 1 & 0 < t < T_S \\ 0 & \text{otherwise} \end{cases} \quad (2)$$

The $z_{l,k}$ represents digital data mapped for QPSK modulation, where 2-bit data 00, 01, 10, 11 are mapped to the four values 1, j, −1, −j (phases 0, π/2, π, −π/2), respectively.

For frame synchronization on the receiving side, the signal level is set to 0 only in the duration of a leading symbol (l=0) in each frame (which is referred to as a null symbol hereinafter).

$$z_{0,k} = 0 (k=-K/2, \ldots, K/2) \quad (3)$$

In the next symbol (l=1) following the null symbol, a signal with fixed pattern known on the receiving side (a phase reference symbol) is transmitted. That is to say, when a pattern vector of phase reference symbols is represented as $z_{-K/2}, \ldots, z_{K/2}$, the phase reference symbols are transmitted as $$z_{1,k} = z_k (k=-K/2, \ldots, K/2) \quad (4)$$

Where $z_k$ is a value defined for each k.

Now, the phase reference symbol x(t) of the baseband on the transmitting side is given as:

$$x(t) = \sum_{k=-\frac{K}{2}}^{\frac{K}{2}} z_k b(t - T_S) e^{2j\pi k F_S(t-T_S)} \quad (5)$$

which is quadrature-modulated to the center frequency $f_c$ in a transmitter and transmitted.

FIG. 1 shows a digital broadcasting receiver according to a first preferred embodiment of the present invention. In this diagram, an OFDM signal in the RF frequency band provided as input from the antenna 1 is amplified in the RF amplifier 2, multiplied by a signal outputted from the voltage-controlled oscillator 10 in the mixer 3 and thus downconverted into an intermediate frequency (IF) signal, bandwidth-limited and amplified to an appropriate signal level in the IF amplifier 4, quadrature-demodulated in the quadrature demodulator 5, and then the I (in-phase) signal component and the Q (quadrature) signal component in the band of baseband frequency are inputted to the A/D converter 6. The signals of the I component and the Q component converted into digital data in the A/D converter 6 are inputted to the symbol selector 15 and partitioned for each symbol, inputted to the FFT processor 7 and transformed into complex number data in the frequency domain, inputted to the differential demodulator 20 and differential demodulated, and inputted to the error corrector 8, and then the data after error corrected is outputted to the digital output terminal 9.

The block of the phase corrector 13 and the product-sum operation portion 12 forms a frequency deviation detecting operation unit 101.

Each element $X'(\omega_k)$ (k=-K/2, ..., K/2) of the vector of phase reference symbols (a vector of demodulation data) converted into the frequency domain in the FIT processor 7 is inputted to the phase corrector 13. The sign (ʹ) indicates received data hereinafter.

The phase corrector 13 applies phase correction to $X'(\omega_k)$ (k=-K/2, ..., K/2) to calculate vectors including elements $Y'_i(\omega_k)$ in an appropriate range of i as shown below. Where $z_k^*$ represents a conjugate complex number of $z_k$. The phase reference symbols to be transmitted are defined and defined conjugate complex numbers of phase reference symbols are also defined values, which are previously stored in the digital broadcasting receiver.

$$Y'_i(\omega_k) = X'(\omega_k) z_{k-i}^* \quad (6)$$

Each element $Y'_i(\omega_k)$ (k=-K/2, ..., K/2) of the vectors each calculated for each value of i in the phase corrector 13 is inputted to the product-sum operation portion 12, where elements separated by the same numbers forward and backward from an mth (about k) element are multiplied for each i and the results are added. Then the results of the product-sum operation for each i, $W_i$, is inputted to the frequency deviation detector 11. Where $W_i$ is given as:

$$W_i = \sum_{n=0}^{\frac{K}{2}-|m|} Y'_i(\omega_{m+n}) Y'_i(\omega_{m-n}) \quad (7)$$

In the frequency deviation detector 11, the value of i which gives a maximum absolute value of $W_i$ calculated in the appropriate range of i is detected, and the oscillation frequency of the voltage-controlled oscillator 10 is controlled so that i becomes equal to 0, by lowering the oscillation frequency of the voltage-controlled oscillator 10 if that i is positive, and raising the oscillation frequency if it is negative.

The processing of detecting the frequency error on the basis of calculation of $W_i$ will now be described in detail. First, a description is given on the case where the frequency down converting correctly operates and the baseband signal x'(t) on the receiving side can be considered to be equal to the transmitted signal x(t).

When a phase reference symbol $x_k(t)$ on the transmitting side corresponding to a kth carrier is given as:

$$x_k(t) = z_k b(t-T_S) e^{2j\pi k F_S(t-T_S)} \quad (8)$$

then $X_k(\omega)$, which is obtained by converting $x_k(t)$ into the frequency domain, can be represented as:

$$X_k(\omega) = z_k T_S \frac{\sin\frac{\omega-\omega_k}{2}T_S}{\frac{\omega-\omega_k}{2}T_S} e^{j\frac{\omega-\omega_k}{2}T_S} \quad (9)$$

Where $\omega_k = 2\pi k F_s$.

Now, as x(t) is given as:

$$x(t) = \sum_{k=-\frac{K}{2}}^{\frac{K}{2}} x_k(t) \quad (10)$$

then $X(\omega)$ is given as:

$$X(\omega) = \sum_{i=-\frac{K}{2}}^{\frac{K}{2}} X_i(\omega) \quad (11)$$

Calculation of $X(\omega_{-K/2})$, ..., $X(\omega_{K/2})$ from x(t) can be efficiently accomplished by using the fast Fourier transform (FFT) algorithm. From the equation (9), $X_i(\omega_k)=0$ when $\omega=\omega_k$ and $i \neq k$, and thus:

$$X(\omega_k) = X_k(\omega_k) \quad (12)$$

At this time, from the equation (9) and the equation (12), $Y_0(\omega_k) = X(\omega_k) z_k^*$ is calculated as $$Y_0(\omega_k) = T_S \quad (13)$$

(where $z_k^*$ is a conjugate complex number of $z_k$), and then $$W_0 = \sum_{n=0}^{\frac{K}{2}-|m|} T_S^2 = \left(\frac{K}{2} - m + 1\right) T_S^2 \quad (14)$$

Then, as individual data $Y_0(\omega_k)$ to be added match in phase, data having magnitude corresponding to the number of added data appear as the result.

Next, when the frequency down converting on the receiving side is imperfect and the received phase reference symbol signal x'(t) of the baseband is shifted from the transmitted signal x(t) by a frequency $\omega_N$, an integral multiple (N times) of the carrier frequency interval $2\pi F_s$, the data vector $Y'_i(\omega_{-K/2})$, ..., $Y'_i(\omega_{K/2})$ are calculated in an appropriate range of an integer i as:

$$Y'_i(\omega_k) = X'(\omega_k)z_{k-i}^* \qquad (15)$$

$$= X(\omega_k - \omega_N)z_{k-i}^*$$

$$= X(\omega_{k-N})z_{k-i}^*$$

Then when $W_i$ is calculated from the equation (7), the absolute value of $W_i$ becomes maximum when i=N, from the equation (15). When i≠N, individual data differ in phase after phase correction, so that the absolute values of the results of addition, $W_i$, are considerably smaller than that in the case of i=N. Hence, obtaining i which maximizes the absolute value of $W_i$ by the method stated above enables detection of the frequency deviation at the time of reception. The relation with i=0, i.e., the relation between $X'(\omega_k)$ and $z_k$ corresponds to a particular relation, and a relation shifted by i (≠0) from the particular relation corresponds to the relation between $X'(\omega_k)$ and $z_{k-i}$.

When the symbols of the signal inputted to the FFT processor are imperfectly partitioned and the timing is shifted by Δt, the received signal x'(t) of the phase reference symbol is given as:

$$x'(t) = \sum_{k=-\frac{K}{2}}^{\frac{K}{2}} z_k b(t - T_S - \Delta t)e^{2j\pi k F_S(t-T_S-\Delta t)} \qquad (16)$$

At this time, the phase reference symbol $X'_k(\omega)$ in the frequency domain corresponding to the kth carrier is given as:

$$X'_k(\omega) = z_k T_s \frac{\sin\frac{\omega - \omega_k}{2}T_S}{\frac{\omega - \omega_k}{2}T_S} e^{j\frac{\omega-\omega_k}{2}T_S} e^{j\omega_k \Delta t} \qquad (17)$$

At this time, the phase reference symbol $X'(\omega_k)$ in the frequency domain received at each carrier frequency is equal to $X'_k(\omega_k)$, and the phase correction result $Y'(\omega_k)=X'(\omega_k)z_k^*$ is given as:

$$Y_0(\omega_k)=T_S e^{j\omega_k \Delta t} \qquad (18)$$

Then $W_0$ is calculated from the equation (7) by using a particular frequency $\omega_m$ as a center as:

$$W_0 = \sum_{n=0}^{\frac{K}{2}-|m|} T_S^2 e^{2j\omega_k \Delta t} = \left(\frac{K}{2} - m + 1\right)T_S^2 e^{2j\omega_k \Delta t} \qquad (19)$$

Then, though the phase changes according to the particular frequency $\omega_m$ and the timing variation Δt in partitioning symbols, data having amplitude corresponding to the number of added data appears as well.

Similarly, when the frequency down converting on the receiving side is imperfect and the received phase reference symbol is shifted by a frequency $\omega_N$ which is an integral multiple of the carrier frequency interval, the data vector $Y'_i(\omega_{-K/2}), \ldots, Y'_i(\omega_{K/2})$ are calculated in the range of an appropriate integer i as well. When $W_i$ is calculated from this, $W_i$ becomes maximum when i=N from the equation (15). Thus it is possible to effectively detect the frequency deviation in carrier frequency interval units at the time of reception of the OFDM signal and provide synchronization control by obtaining i which maximizes the absolute value of $W_i$.

The phase corrector 13 to the frequency deviation detector 11 can be structured as program processing by using a digital signal processor (DSP) or the like.

Second Preferred Embodiment

Figure 2:
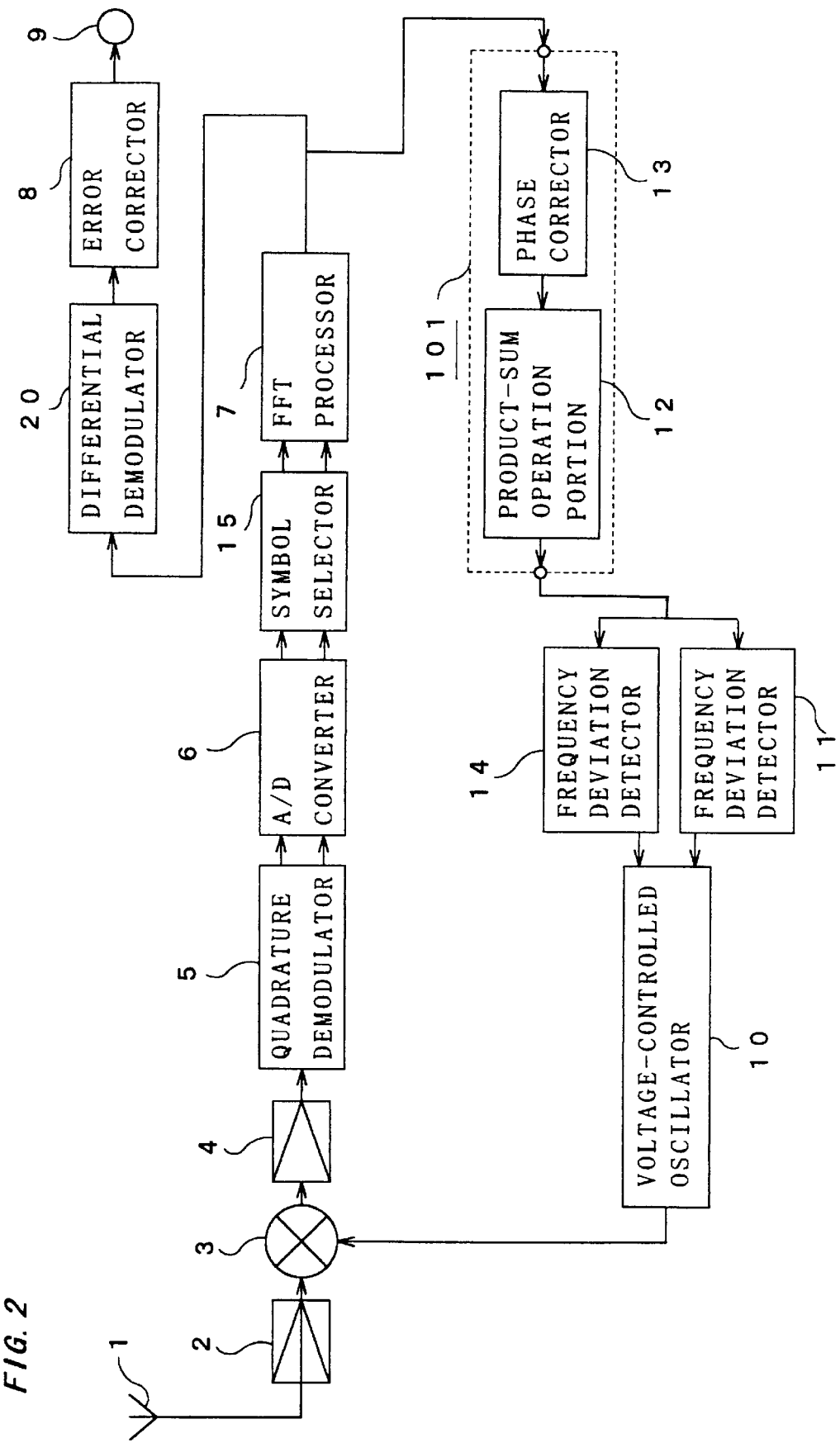
FIG. 2 is a block diagram showing the structure of a digital broadcasting receiver according to a second preferred embodiment of the present invention.

FIG. 2 is a block diagram showing the structure of a digital broadcasting receiver according to a second preferred embodiment of the present invention. In the diagram, an OFDM signal in the RF frequency band provided as input from the antenna 1 is amplified in the RF amplifier 2, multiplied by the signal outputted from the voltage-controlled oscillator 10 in the mixer 3 to be downconverted into an intermediate frequency (IF) signal, bandwidth-limited and amplified to an appropriate signal level in the IF amplifier 4, quadrature-demodulated in the quadrature demodulator 5, and then the I (in-phase) signal component and the Q (quadrature) signal component in the band of baseband frequency are inputted to the A/D converter 6. The signals of the I component and the Q component converted into digital data in the A/D converter 6 are inputted to the symbol selector 15 and partitioned for each symbol, inputted to the FFT processor 7 and transformed into complex number data in the frequency domain, inputted to the differential demodulator 20 and differential demodulated, inputted to the error corrector 8, and then the data after error corrected is outputted to the digital output terminal 9.

The block of the phase corrector 13 and the product-sum operation portion 12 forms a frequency deviation detecting operation unit 101.

Each element $X'(\omega_k)$(k=-K/2, ..., K/2) of the vector of phase reference symbols converted into the frequency domain in the FFT processor 7 is inputted to the phase corrector 13.

The phase corrector 13 applies phase correction to each element $X'(\omega_k)$(k=-K/2, ..., K/2) of the vector of the phase reference symbols in the frequency domain to calculate each element $Y'_i(\omega_k)$ of vectors of data as shown by the equation (6) in an appropriate range of i.

Each element $Y'_i(\omega_k)$(k=-K/2, ..., K/2) of the vectors each calculated in the phase corrector 13 for each value of i is inputted to the product-sum operation portion 12, where elements separated by the same numbers forward and backward from a frequency element m are multiplied together and the results are added for each i. The results of addition, $W_i$, are inputted to the frequency deviation (corresponding to the carrier frequency interval(s)) detector 11 and the frequency deviation (smaller than the carrier frequency interval) detector 14. Where $W_i$ is given by the equation (7).

In the frequency deviation (corresponding to the carrier frequency interval(s)) detector 11, a value of i which provides a maximum absolute value of $W_i$ calculated in an appropriate range of i is detected and the phase corresponded with that $W_i$ is detected, too. In the frequency deviation (smaller than the carrier frequency interval) detector 14, the phase of $W_i$ having a maximum absolute value is detected.

The oscillation frequency of the voltage-controlled oscillator 10 is controlled so that i is equal to 0 by lowering the oscillation frequency of the voltage-controlled oscillator 10 if i is positive and increasing the oscillation frequency if it is negative. The oscillation frequency of the voltage-controlled oscillator 10 is also controlled according to a shift of the phase corresponded with that $W_i$ from a previously known ideal value.

In the digital broadcasting receiver constructed as stated above, when frequency down converting on the receiving side is imperfect and the received phase reference symbol signal x'(t) of the baseband is shifted with respect to the transmitted signal x(t) by a frequency $\omega_N$, an integer multiple of the carrier frequency interval, the frequency deviation can be corrected by the same means as the first preferred embodiment of the invention.

Now a description is given on the case where the received phase reference symbol signal x'(t) of the baseband is shifted with respect to the transmitted signal x(t) by a frequency $\Delta\omega$ which is smaller than the carrier frequency interval. The phase reference symbol $X_k(\omega)$ in the frequency domain on the transmitting side corresponding to a carrier k is represented by the equation (9), and the component $X'_k(\omega)$ of the carrier k of the received phase reference symbol in the frequency domain is expressed as:

$$X'_k(\omega) = z_k T_S \frac{\sin\frac{\omega-\omega_k-\Delta\omega}{2}T_S}{\frac{\omega-\omega_k-\Delta\omega}{2}T_S} eSUPj\frac{\omega-\omega_k-\Delta\omega}{2}T_S \quad (20)$$

Where, when $\omega=\omega_k$ and $i \neq k$, the relation of $X_i(\omega_k)=0$ does not hold and hence $X(\omega_k) \neq X_k(\omega_k)$, but as the ratio of the $X_k(\omega_k)$ component in $X(\omega_k)$ is sufficiently large as compared with interference components from other carriers, and then:

$$X'(\omega_k) \approx X'_k(\omega_k) \quad (21)$$

At this time, the phase correction result $Y'_0(\omega_k) = X'(\omega_k) z_k^*$ is given as:

$$Y'_0(\omega_k) = T_S \frac{\sin\frac{\Delta\omega}{2}T_S}{\frac{\Delta\omega}{2}T_S} e^{j\frac{\Delta\omega}{2}T_S} \quad (22)$$

Then the product-sum operation result $W_0$ is given as:

$$W_0 = \sum_{n=0}^{\frac{K}{2}-m}\left(T_S \frac{\sin\frac{\Delta\omega}{2}T_S}{\frac{\Delta\omega}{2}T_S}e^{j\frac{\Delta\omega}{2}T_S}\right)^2 \quad (23)$$

$$= \left(\frac{K}{2}-m+1\right)\left(T_S\frac{\sin\frac{\Delta\omega}{2}T_S}{\frac{\Delta\omega}{2}T_S}\right)e^{j\Delta\omega T_S}$$

Then obtained is a sum of data whose phase deviates from a reference point with its amplitude decreasing with sin $(\Delta\omega T_S/2)/(\Delta\omega T_S/2)$ in accordance with the magnitude of the frequency deviation, $\Delta\omega$, which enables the frequency deviation smaller than the carrier frequency interval to be detected and corrected.

The phase corrector 13, the product-sum operation portion 12, the frequency deviation (corresponding to the carrier frequency interval(s)) detector 11, and the frequency deviation (smaller than the carrier frequency interval) detector 14 can be constituted as program processing by using a digital signal processor (DSP) or the like.

Third Preferred Embodiment

Figure 3:
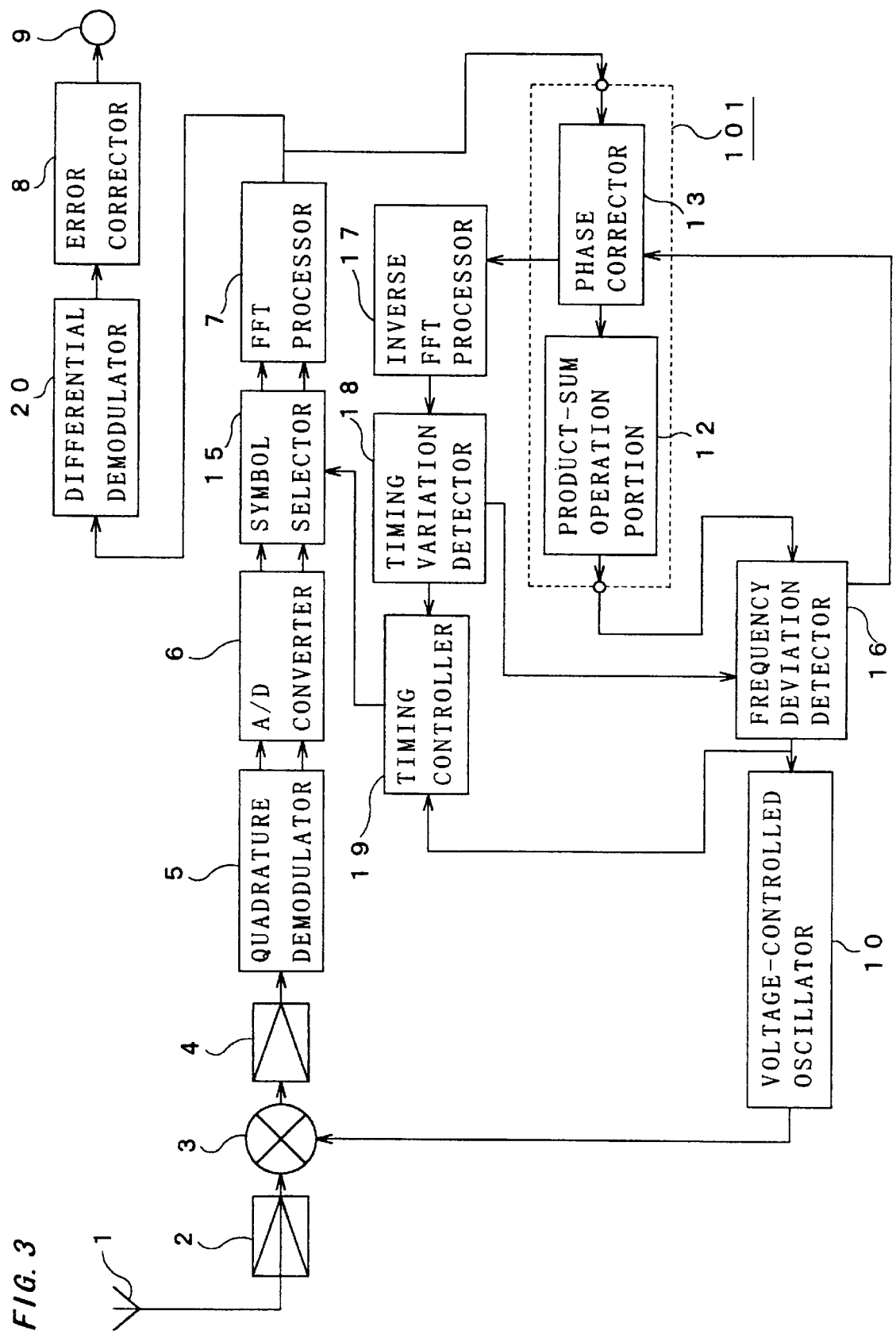
FIG. 3 is a block diagram showing the structure of a digital broadcasting receiver according to a third preferred embodiment of the present invention.

FIG. 3 is a block diagram showing the structure of a digital broadcasting receiver according to a third preferred embodiment of the present invention. In this diagram, an OFDM signal in the RF frequency band provided as input from the antenna 1 is amplified in the RF amplifier 2, multiplied by the signal outputted from the voltage-controlled oscillator 10 in the mixer 3 to be downconverted into an intermediate frequency (IF) signal, bandwidth-limited and amplified to an appropriate signal level in the IF amplifier 4, quadrature-demodulated in the quadrature demodulator 5, and then the I (in-phase) signal component and the Q (quadrature) signal component in the band of baseband frequency are inputted to the A/D converter 6. The signals of the I component and the Q component converted into digital data in the A/D converter 6 are inputted to the symbol selector 15 and partitioned for each symbol, inputted to the FFT processor 7 and transformed into complex number data in the frequency domain, inputted to the differential demodulator 20 and differential demodulated, inputted to the error corrector 8, and then the data after error corrected is outputted to the digital output terminal 9.

The block of the phase corrector 13 and the product-sum operation portion 12 forms a frequency deviation detecting operation unit 101.

Each element $X'(\omega_k)(k=-K/2, \ldots, K/2)$ of the vector of phase reference symbols transformed into the frequency domain in the FFT processor 7 is inputted to the phase corrector 13.

In the phase corrector 13, phase correction is applied to each element $X'(\omega_k)$ $(k=-K/2, \ldots, K/2)$ of the vector of the phase reference symbols in the frequency domain to calculate vectors $Y'_i(\omega_k)$ in an appropriate range of i by the expression (6).

Each element $Y'_i(\omega_k)(k=-K/2, \ldots, K/2)$ of the vectors each calculated for each value of i in the phase corrector 13 is inputted to the product-sum operation portion 12, where elements separated by the same numbers forward and backward from a frequency element $\omega_m$(m is an integer) are multiplied together and the results are added for each i. The results $W_i$ of the operation are inputted to the frequency deviation detector 16. $W_i$ is given by the equation (7).

In the frequency deviation detector 16, a value of i which provides a maximum absolute value of $W_i$ calculated in the appropriate range of i is detected, and the phase corresponded with that $W_i$ is detected, too. The oscillation frequency of the voltage-controlled oscillator 10 is controlled so that i is equal to 0, in which if the i is positive, the oscillation frequency of the voltage-controlled oscillator 10 is lowered, and if it is negative, the oscillation frequency is raised. The frequency deviation detector 16 has the functions of both of the frequency deviation detectors 11 and 14.

Each element $Y'_i(\omega_k)(k=-K/2, \ldots, K/2)$ of the vector calculated in the phase corrector 13 about the i which maximizes the absolute value of $W_i$ calculated in the product-sum operation portion 12 is inputted to the inverse FFT processor 17 and is subjected to inverse FFT. The vector $\{\ldots, y'_i(t), \ldots\}$ is inputted to the timing variation detector 18.

The timing variation detector 18 obtains a peak value and the time at which the peak occurs in the inputted vector $\{\ldots, y'_i(t), \ldots\}$ and detects a timing variation from it, which is outputted to the timing controller 19.

The timing controller 19 adjusts the symbol selector 15 in accordance with the output from the timing variation detector 18 so that data partitions coincide with symbol partitions.

The frequency deviation detector 16 detects the phase for the maximum absolute value of $W_i$ calculated in an appropriate range of i and controls the oscillation frequency of the voltage-controlled oscillator 10 in accordance with the shift phase corresponded with that $W_i$ from a previously known ideal value.

The timing controller properly skips the symbol selecting timing correction when the frequency deviation is correctly detected and corrected.

In the digital broadcasting receiver constructed as stated above, similarly to the first preferred embodiment, it is possible to detect and correct a frequency deviation in carrier frequency interval units occurring when frequency down converting even when there is a certain degree of shift in timing for partitioning symbols.

Consider the case in which there is a timing variation $\Delta t$ in partitioning the symbols of the signal inputted to the FFT processor 7. In the vectors $\{ \ldots, Y_i'(\omega_k), \ldots \}$ resulting from phase correction in the appropriate range of i in the phase corrector 13, each element in the vector $\{ \ldots, Y_i'(\omega_k), \ldots \}$ corresponding to i which maximizes the absolute value of $W_i$ detected in the frequency deviation detector 11 is phase-corrected. Accordingly, the phase linearly changes according to $\omega_k$ with uniform amplitude and the inclination of phase is determined by $\Delta t$, like $Y_0'(\omega_k)$ in the equation (18).

Accordingly, the vector $\{ \ldots, y_i'(t), \ldots \}$ obtained by applying inverse FFT to the vector $\{ \ldots, Y_i'(\omega_k), \ldots \}$ is in impulse-like form and detecting the time at which the peak appears provides the timing variation $\Delta t$ in the symbol partitioning.

When there is a certain extent of shift $\Delta t$ in timing for partitioning symbols, $\Delta t$ having already been detected by the above means, and there is a frequency deviation $\Delta \omega$ smaller than the carrier frequency interval when frequency down converting, each element $Y_0'(\omega_k)$ of the vector resulting from phase correction in the phase corrector 13 is given as:

$$Y_0'(\omega_k) = T_S \frac{\sin \frac{\Delta \omega}{2} T_S}{\frac{\Delta \omega}{2} T_S} e^{j \frac{\Delta \omega}{2} T_S} e^{j \omega_k \Delta t} \quad (24)$$

From $\omega_k = 2\pi k F_S$, $\omega_{m+n} = \omega_m + \omega_n$ and $\omega_{m-n} = \omega_m - \omega_n$, then the product-sum operation result $W_0$ is given as:

$$W_0 = \sum_{n=0}^{\frac{K}{2}-|m|} \left( T_S \frac{\sin \frac{\Delta \omega}{2} T_S}{\frac{\Delta \omega}{2} T_S} e^{j \frac{\Delta \omega}{2} T_S} \right)^2 e^{j \omega_{m+n} \Delta t} e^{j \omega_{m-n} \Delta t} \quad (25)$$

$$= \left( \frac{K}{2} - m + 1 \right) \left( T_S \frac{\sin \frac{\Delta \omega}{2} T_S}{\frac{\Delta \omega}{2} T_S} \right)^2 e^{j \Delta \omega T_S} e^{2 j \omega_m \Delta t}$$

Since $\omega_m$, the frequency regarded as the center in the calculation of $W_0$, is known and the variation $\Delta t$ when partitioning symbols is also known, the frequency deviation $\Delta \omega$ smaller than the carrier frequency interval can be detected by eliminating the phase rotation term by $\omega_m$ and $\Delta t$ included in $W_0$ in the equation (25).

As stated above, even if the symbol selecting timing is shifted to some extent, it is possible, if $\Delta t$ is detected, to detect and correct a frequency deviation. Accordingly, when the frequency deviation is being properly detected and corrected, correction of symbol selecting timing can be omitted at a certain ratio.

The phase corrector 13, the product-sum operation portion 12, the frequency deviation detector 16, the inverse FFT processor 17, and the timing variation detector 18 can be structured as program processing by using a digital signal processor (DSP) or the like.

Fourth Preferred Embodiment

Figure 4:
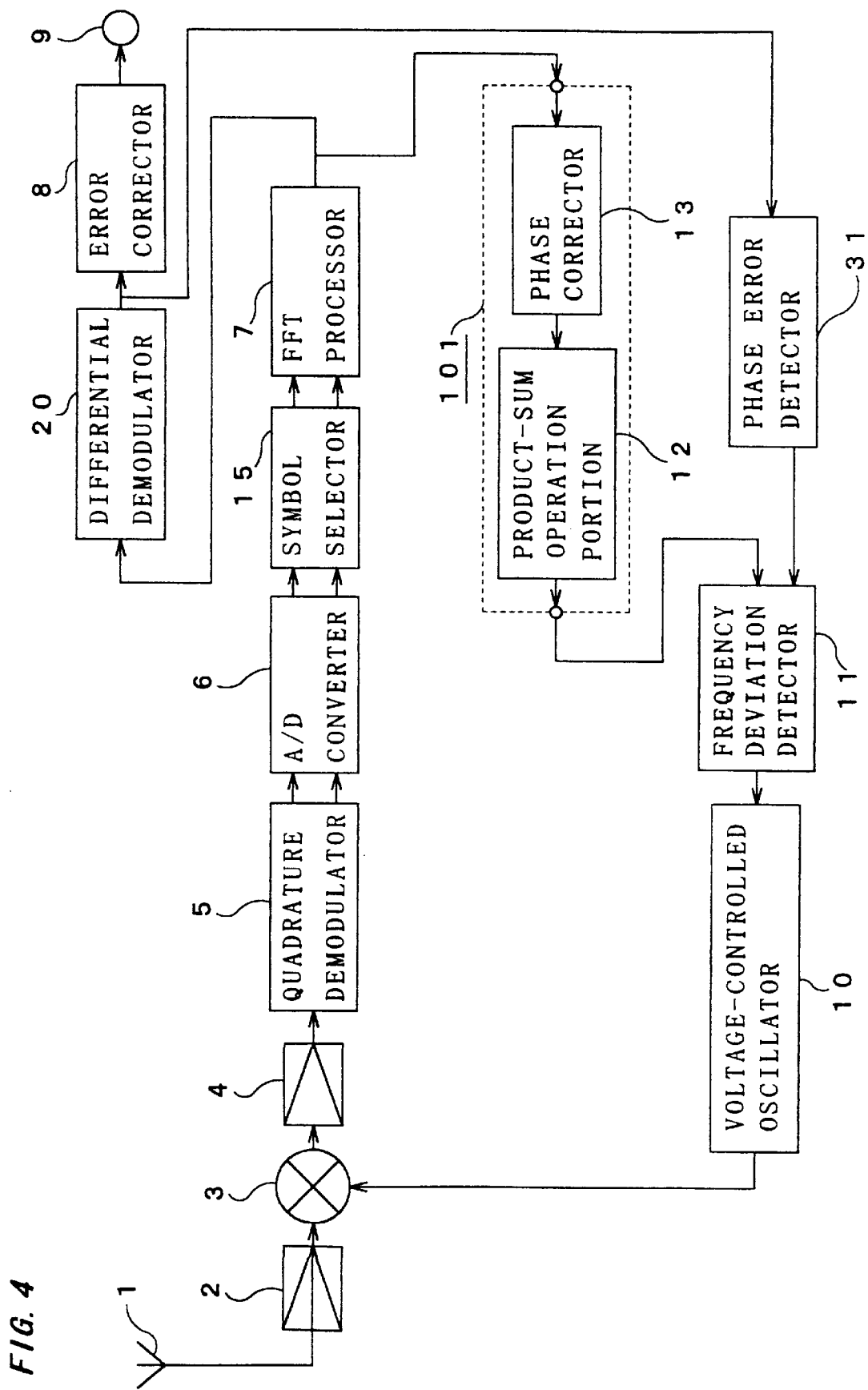
FIG. 4 is a block diagram showing the structure of a digital broadcasting receiver according to a fourth preferred embodiment of the present invention.

FIG. 4 is a block diagram showing the structure of a digital broadcasting receiver according to a fourth preferred embodiment of the present invention. In this diagram, an OFDM signal in the RF frequency band provided as input from the antenna 1 is amplified in the RF amplifier 2, multiplied by the signal outputted from the voltage-controlled oscillator 10 in the mixer 3 to be downconverted into an intermediate frequency (IF) signal, band-limited and amplified to an appropriate signal level in the IF amplifier 4, quadrature-demodulated in the quadrature demodulator 5, and then the I (in-phase) signal component and the Q (quadrature) signal component in the band of baseband frequency are inputted to the A/D converter 6. The signals of the I component and the Q component converted into digital data in the A/D converter 6 are inputted to the symbol selector 15 and partitioned for each symbol, inputted to the FFT processor 7 and transformed into complex number data in the frequency domain, inputted to the differential demodulator 20 and differential demodulated, inputted to the error corrector 8, and then the data after error corrected is outputted to the digital output terminal 9.

The block of the phase corrector 13 and the product-sum operation portion 12 forms a frequency deviation detecting operation unit 101.

Each element $X'(\omega_k)(k=-K/2, \ldots, K/2)$ of the vector of phase reference symbols converted into the frequency domain in the FFT processor 7 is inputted to the phase corrector 13.

The phase corrector 13 calculates each element $Y'_i(\omega_k)$ of vectors in an appropriate range of i by applying phase correction to each element $X'(\omega_k)(k=-K/2, \ldots, K/2)$ of the vector of the phase reference symbols in the frequency domain according to the expression (6).

Each element $Y'_i(\omega_k)(k=-K/2, \ldots, K/2)$ of the vectors each calculated for each value of i in the phase corrector 13 is inputted to the product-sum operation portion 12, where elements separated by the same numbers forward and backward from a frequency $\omega_m$, as a center, are multiplied together and the results are added for each i. The operation results $W_i$ are inputted to the frequency deviation detector 11. Where $W_i$ is given by the equation (7).

A value of i which maximizes the absolute value of $W_i$ calculated in the appropriate range of i is detected in the frequency deviation detector 16 and the frequency deviation is detected according to the corresponding value of $W_i$, similarly to the first to third preferred embodiments of the invention.

A phase difference between an FFT output symbol for each carrier and the preceding symbol at the same frequency is obtained in the differential demodulator 20, which is inputted to a phase error detector 31 and multiplied by itself for the number of phases of phase modulation on the transmitting side, and the average is obtained.

When the number of phases of the phase modulation on the transmitting side is four (QPSK), the result of the differential demodulation ideally provides the four values 0, $\pi/2$, $\pi$, $-\pi/2$. An average of the fourth powers thereof is ideally 0. A phase error at the time of reception appears when it gets out of the ideal condition. Since the phase shift is correctable by the voltage-controlled oscillator 10, the result of the phase error detection is inputted to the frequency deviation detector 16.

The frequency deviation detector 16 controls the oscillation frequency of the voltage-controlled oscillator 10 according to the frequency deviation (and the phase shift) detected by the product-sum operation portion 12 and the phase error detector 31.

The phase corrector 13, the product-sum operation portion 12, the frequency deviation detector 16, and the phase error detector 31 may be constituted as program processing by using a digital signal processor (DSP) or the like.

Figure 5:
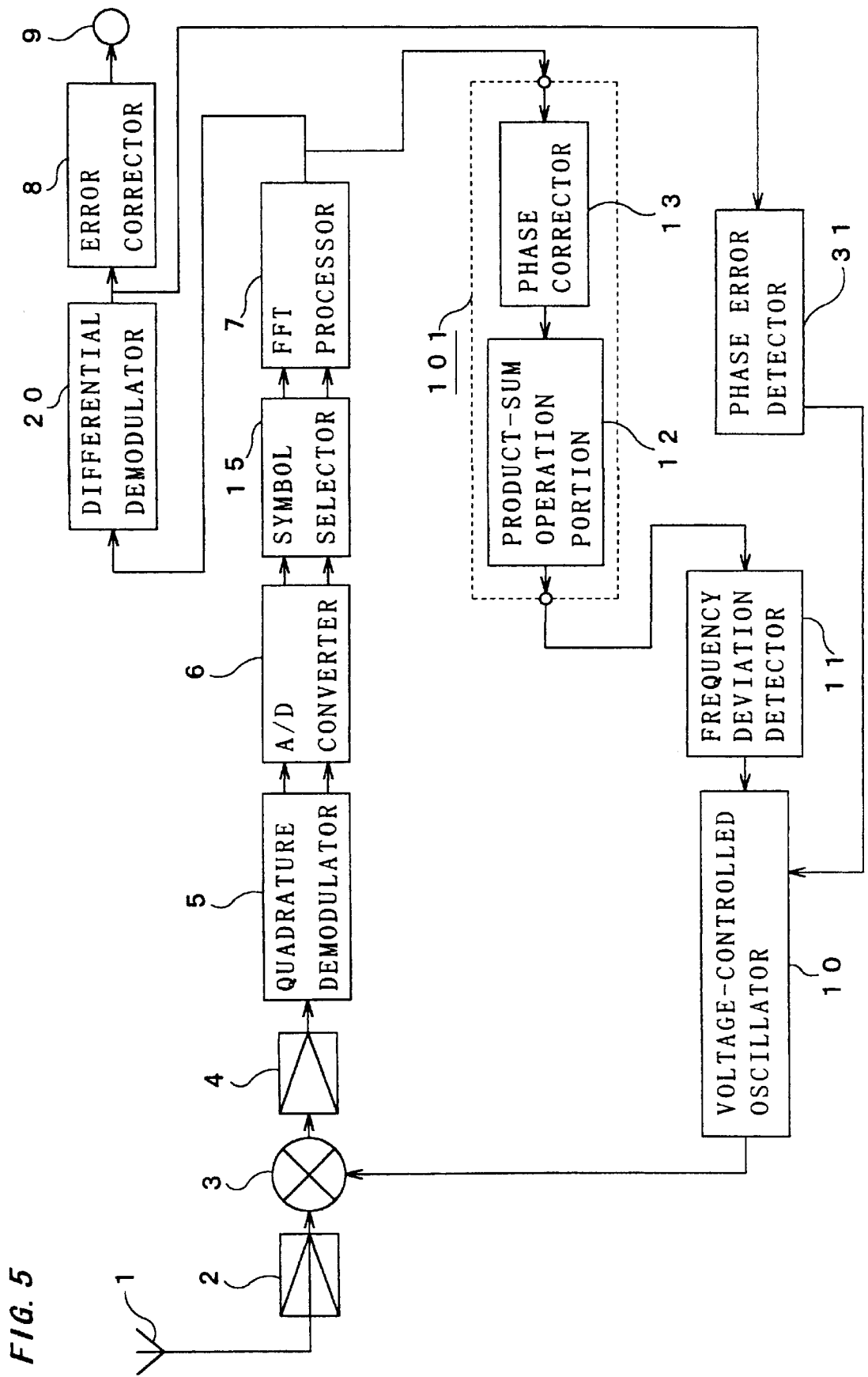
FIG. 5 is a block diagram showing another example of the structure of the digital broadcasting receiver according to the fourth preferred embodiment of the present invention.
Figure 6:
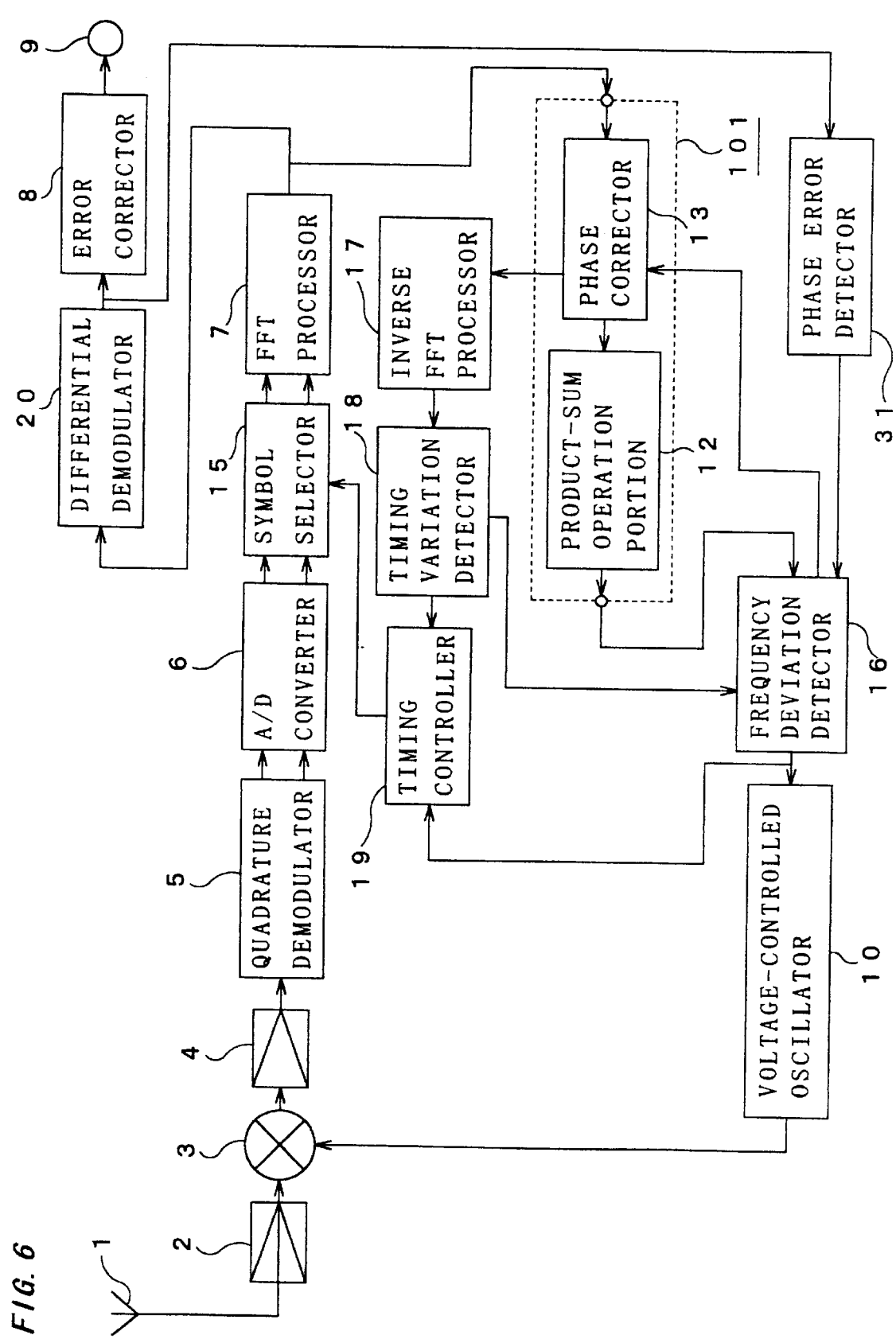
FIG. 6 is a block diagram showing another example of the structure of the digital broadcasting receiver according to the fourth preferred embodiment of the present invention.

The description given above relates to operation for detecting a frequency deviation like the second preferred embodiment. A structure for detecting a frequency deviation like the first preferred embodiment is shown in FIG. 5 and a structure for detecting a timing variation like the third preferred embodiment is shown in FIG. 6. In FIG. 5 and FIG. 6, the same reference characters as those in FIG. 1, FIG. 3, or FIG. 4 denote the corresponding parts.

Fifth Preferred Embodiment

Figure 7:
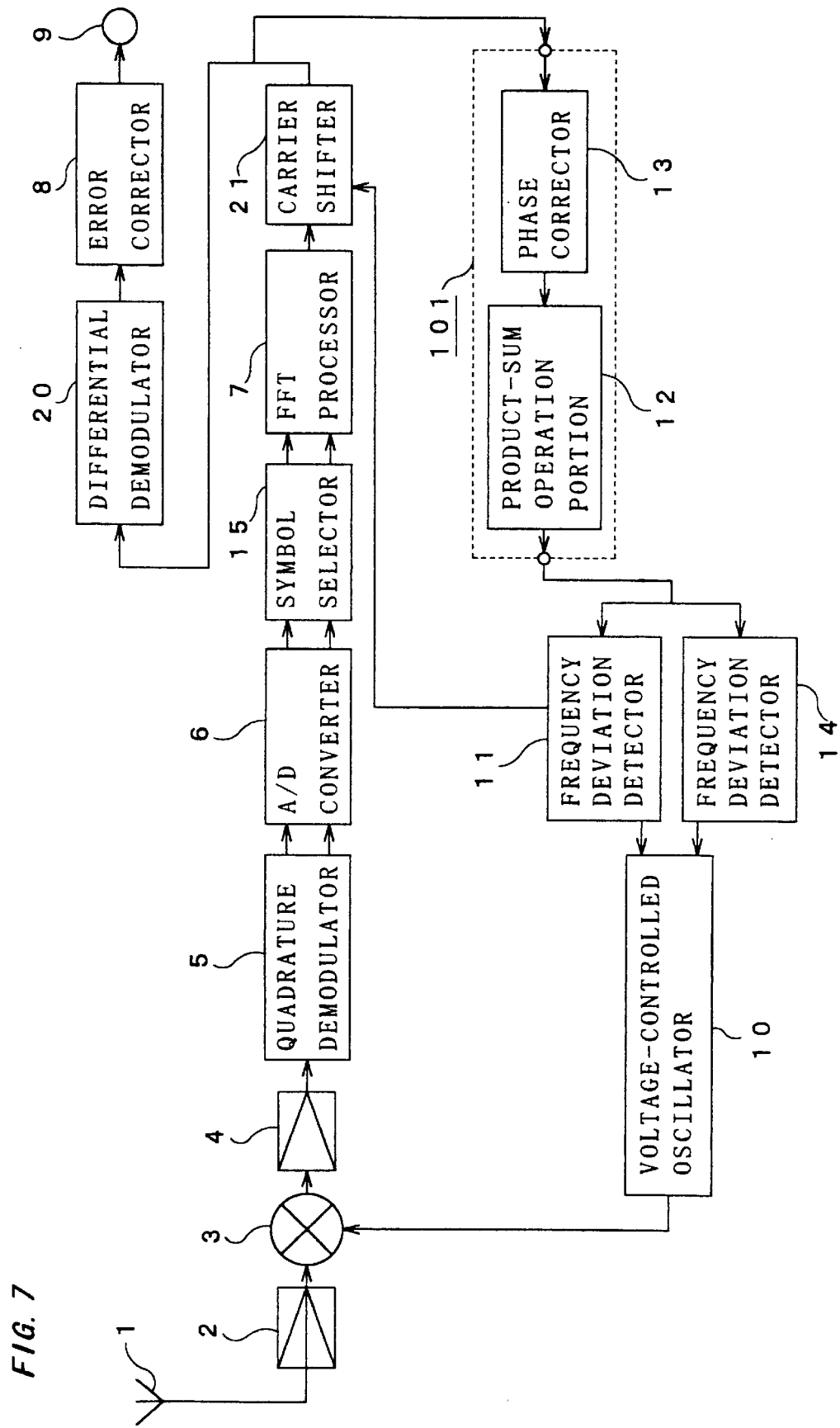
FIG. 7 is a block diagram showing the structure of the frequency deviation operating portion in a digital broadcasting receiver according to a fifth preferred embodiment of the present invention.

FIG. 7 is a block diagram showing the structure of a digital broadcasting receiver according to a fifth preferred embodiment of the present invention. In this diagram, an OFDM signal in the RF frequency band provided as input from the antenna 1 is amplified in the RF amplifier 2, multiplied by the signal outputted from the voltage-controlled oscillator 10 in the mixer 3 to be downconverted into an intermediate frequency (IF) signal, band-limited and amplified to an appropriate signal level in the IF amplifier 4, quadrature-demodulated in the quadrature demodulator 5, and then the I (in-phase) signal component and the Q (quadrature) signal component in the band of baseband frequency are inputted to the A/D converter 6. The signals of the I component and the Q component converted into digital data in the A/D converter 6 are inputted to the FFT processor 7 and transformed into complex number data in the frequency domain. Then in the carrier shifter 21, the correspondence between frequency and data is shifted and the data is inputted to the error corrector 8, and then the data after error corrected is outputted to the digital output terminal 9.

The block of the phase corrector 13 and the product-sum operation portion 12 forms a frequency deviation detecting operation unit 101.

Like in the second preferred embodiment of the present invention, the phase corrector 13, the product-sum operation portion 12, the frequency deviation (corresponding to an integral multiple of the carrier frequency interval) detector 11, and the frequency deviation (smaller than the carrier frequency interval) detector 14 detect a frequency deviation smaller than the carrier frequency interval and a frequency deviation corresponding to a multiple of the carrier frequency interval. When the frequency deviation corresponding to an integral multiple of the carrier frequency interval is in a certain range, the frequency is adjusted not by the voltage-controlled oscillator but by carrier shift. The frequency deviation detector 11 detects a frequency deviation corresponding to a multiple of the carrier frequency interval, so that the carrier shifter 21 can correct the frequency deviation by shifting the correspondence between frequency and data according to the result from the frequency deviation detector 11.

It is also possible in the first, third and fourth preferred embodiments of the present invention to correct a frequency deviation corresponding to an integral multiple of the carrier frequency interval by carrier shift.

Figure 8:
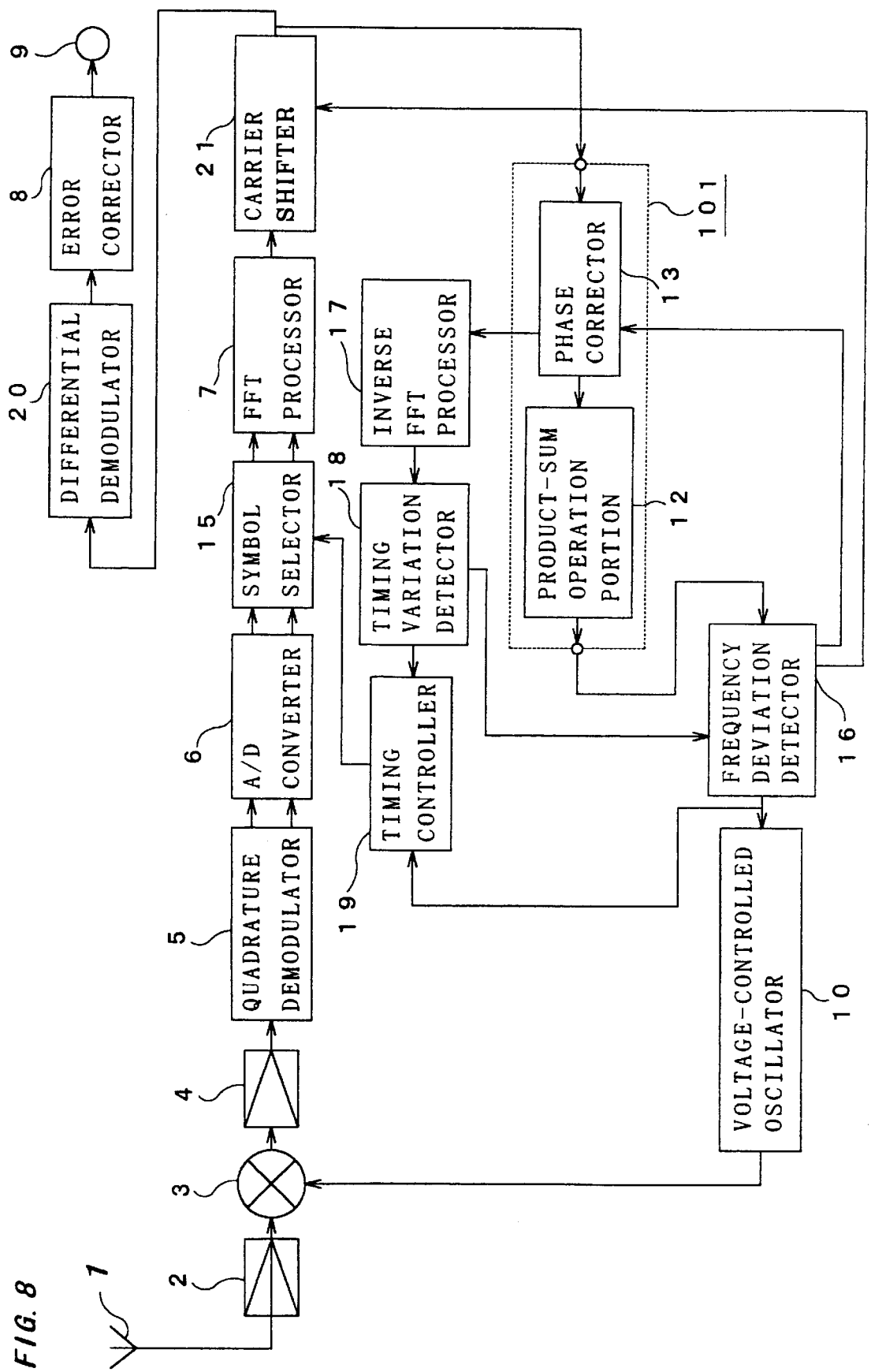
FIG. 8 is block diagram showing another example of structure of the digital broadcasting receiver according to the fifth preferred embodiment.
Figure 9:
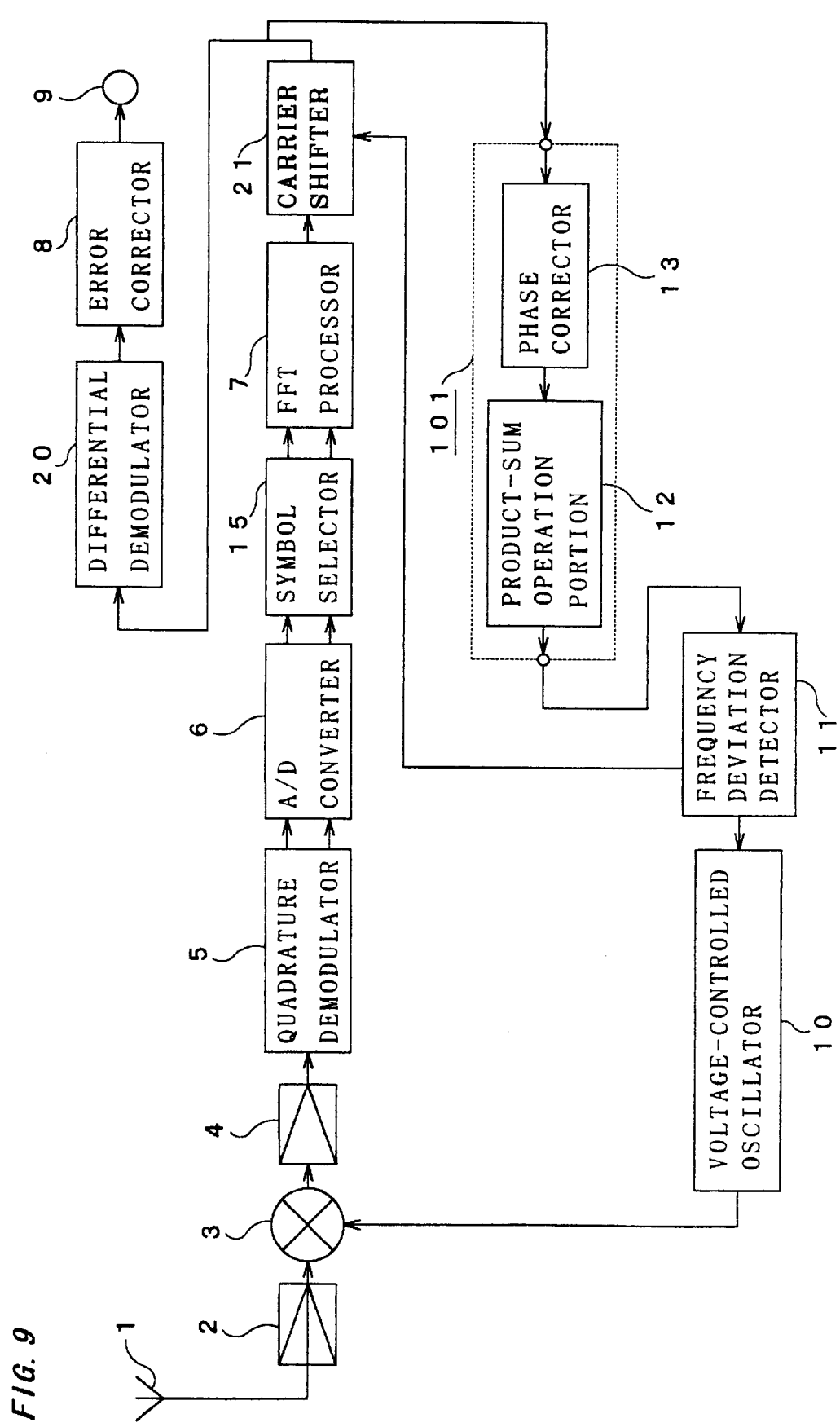
FIG. 9 is block diagram showing another example of structure of the digital broadcasting receiver according to the fifth preferred embodiment.
Figure 10:
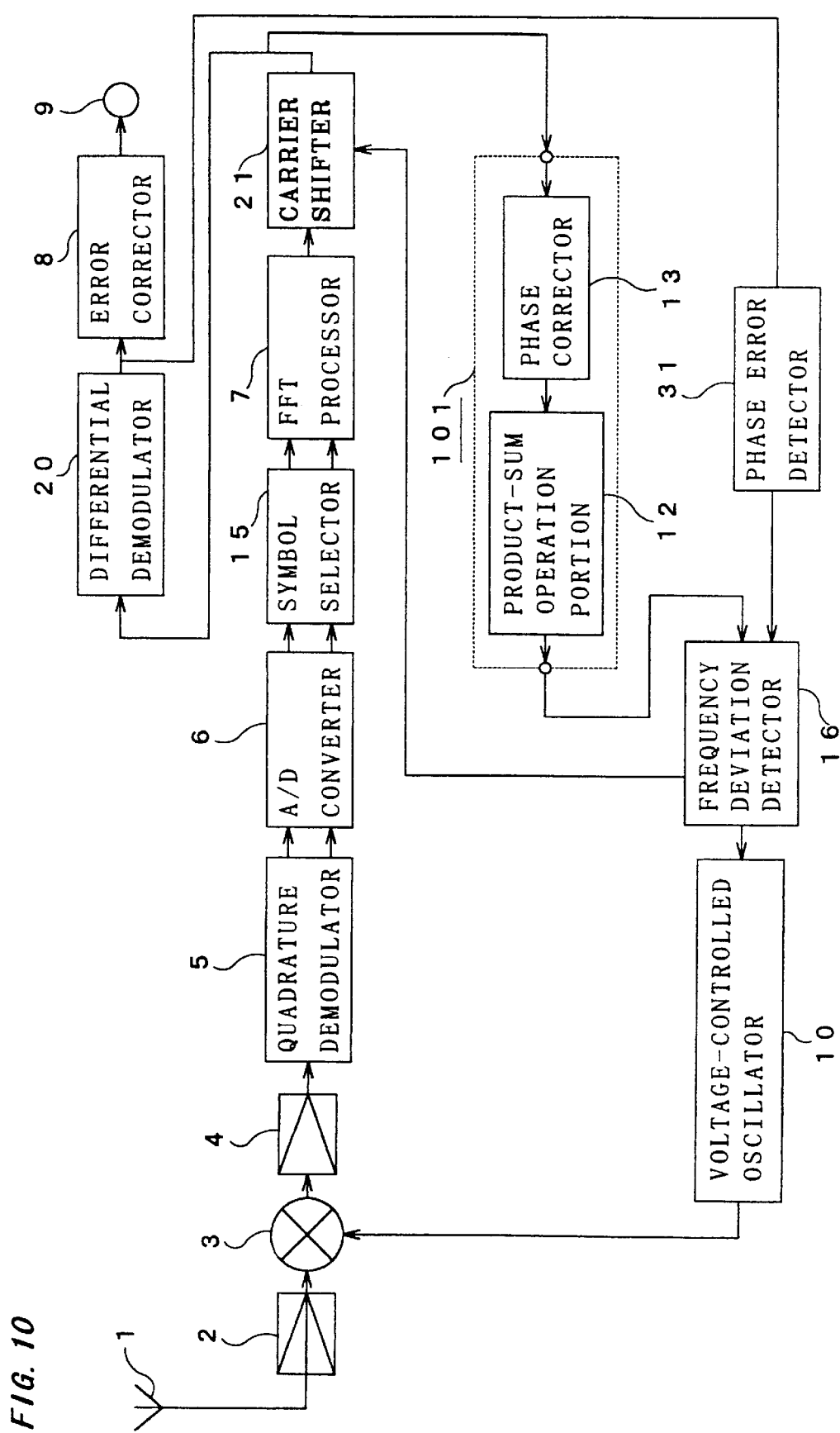
FIG. 10 is block diagram showing another example of structure of the digital broadcasting receiver according to the fifth preferred embodiment.

FIG. 8 to FIG. 10 respectively show structures for correcting a phase shift corresponding to an integral multiple of the carrier frequency interval by carrier shift in the first, third and fourth preferred embodiments of the present invention. In FIG. 8 to FIG. 10, the same reference characters as those in FIG. 1, FIG. 3, FIG. 4 or FIG. 7 indicate the corresponding parts.

Sixth Preferred Embodiment

Figure 11:
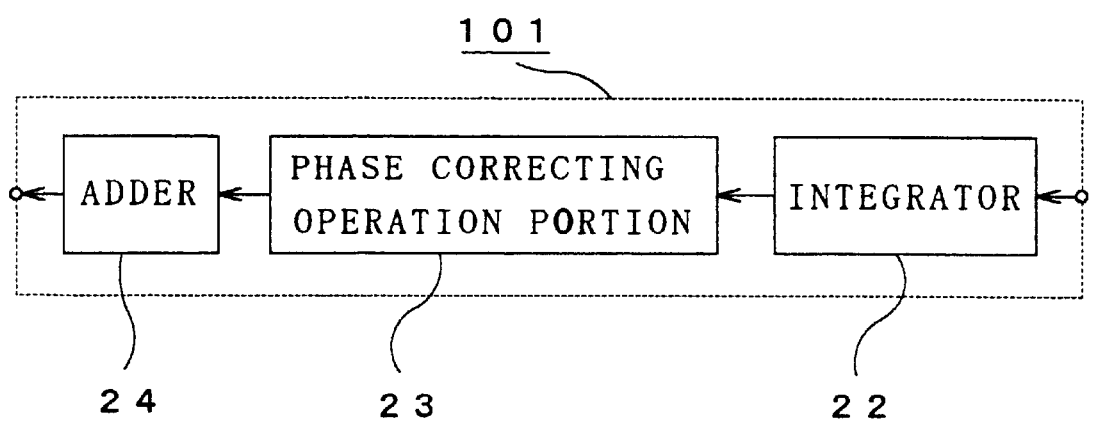
FIG. 11 is a block diagram showing the structure of a digital broadcasting receiver according to a sixth preferred embodiment of the present invention.
Figure 12:
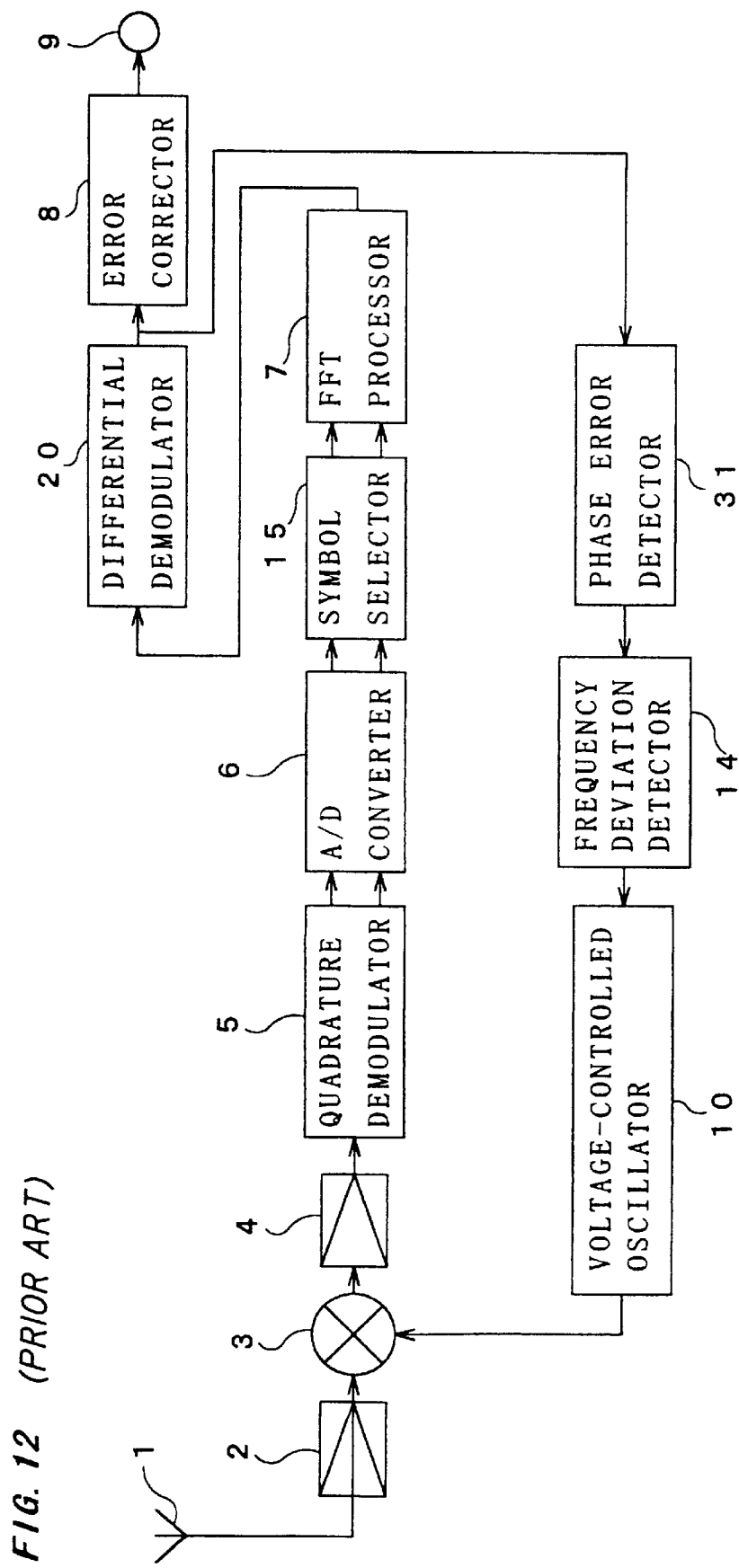
FIG. 12 is a block diagram showing the structure of a conventional digital broadcasting receiver.

In a sixth preferred embodiment of the present invention, the frequency deviation detecting operation unit 101 in the first to fifth preferred embodiments is replaced by the structure shown in FIG. 11.

In FIG. 11, in the integrator 22, elements separated by the same numbers forward and backward from an mth element in the vector of the phase reference symbols outputted from the FFT processor 7 are multiplied together and outputted to the phase correcting operation portion 23. The vector is then multiplied, for each element, by vectors obtained by multiplying elements separated by the same numbers forward and backward from an (m+i)th element (m is an integer) in the vector of defined conjugate complex numbers of phase reference symbols in an appropriate range of i and outputted to the adder 24. Then all elements of the vectors are added for each i and the results of addition, $W'_i$, are outputted.

At this time, from each element $X'(\omega_k)$ of the vector of the received phase reference symbols in the frequency domain and each element $z_k^*$ of the vector of the conjugate complex numbers of the defined values of the phase reference symbols, the results of addition, $W'_i$, is given by the equation below:

$$W'_i = \sum_{n=0}^{\frac{K}{2}-m} \{X'(\omega_{m+n})X'(\omega_{m-n})\}z_{m+n-i}z_{m-n-i} \quad (26)$$

As $Y'_i(\omega_k)=X'(\omega_k)z_{i-k}^*$ in the equation (7), $W'_i$ is equal to $W_i$.

It is possible to reduce the amount of operation by calculating $W_i$ for each i by using a previously calculated vector of $X'_{m+k}X'_{m-k}$ (k=0, 1, . . . , K/2−m).

When each carrier is subjected to quadrature phase shift keying (QPSK), for example, $z_k$ usually takes a simple value such as ±1, ±j. Accordingly, the calculation of $z_{m+k-i}^* z_{m-k-i}^*$ and the operation of multiplying the results by $X'_{m+k}X'_{m-k}$ can be accomplished simply by inverting signs or exchanging real and imaginary parts, which reduces the entire amount of operation.

Seventh Preferred Embodiment

The frequency of 0 Hz in the baseband OFDM signal ($\omega_m=\omega_0=0$) is used as the frequency $\omega_k$ used as the center in the product-sum operation portion 12 which performs product-sum operation with phase reference symbols in the frequency domain after phase correction in the first to sixth preferred embodiments of the present invention.

For example, when the frequency is shifted by a frequency $\Delta\omega$ smaller than the carrier frequency interval at the time of frequency down converting on the receiving side and the partitioning of symbols inputted to the FFT processor is shifted by $\Delta t$, the phase correction result $Y'_0(\omega_k)$ is expressed by the equation (24). From $\omega_k=2\pi kF_S$, $\omega_{-k}=-\omega_k$, and then the product-sum operation result $W_0$ is given as:

$$W_0 = \sum_{n=0}^{\frac{K}{2}} \left( T_S \frac{\sin\frac{\Delta\omega}{2}T_S}{\frac{\Delta\omega}{2}T_S} e^{j\frac{\Delta\omega}{2}T_S} \right)^2 e^{j\omega_m \Delta t} e^{-j\omega_m \Delta t} \quad (27)$$

$$= \left(\frac{K}{2}+1\right)\left(T_S \sin\frac{\Delta\omega}{2} \frac{T_S}{\frac{\Delta\omega}{2}T_S}\right) e^{j\Delta\omega T_S}$$

Thus, the phase rotation term with the frequency $\omega_m$ regarded as the center in the calculation of $W_0$ and the error $\Delta t$ in partitioning symbols can be eliminated, and the phase corresponded with $W_0$ directly indicates the frequency deviation smaller than the carrier frequency interval. Then it is possible to detect and correct a frequency deviation corresponding to an integral multiple of the carrier frequency interval and a frequency deviation smaller than the carrier frequency interval even with a certain degree of $\Delta t$ existing.

Eighth Preferred Embodiment

In an eighth preferred embodiment, the frequency range of carriers used is limited to $\omega_{m-\beta}$ to $\omega_{m-\alpha}$ and $\omega_{m+\alpha}$ to $\omega_{m+\beta}$ by using positive numbers $\alpha$ and $\beta$ which satisfy $0<\alpha\leq\beta<K/2-m$, for example, in the first to seventh preferred embodiments. At this time, the product-sum operation result $W_i$ is given as:

$$W_i = \sum_{n=\alpha}^{\beta} Y_i'(\omega_{m+n}) Y_i'(\omega_{m-n}) \tag{28}$$

frequency deviation corresponding to the carrier frequency interval(s), like in the first preferred embodiment, and then the frequency deviation at the reception can be corrected with i=0.

When a frequency deviation smaller than the carrier frequency interval at reception is $\Delta\omega$ after correction of the frequency deviation corresponding to the carrier frequency interval(s), the product-sum operation result $W_0$ is given as:

$$W_0 = \sum_{n=\alpha}^{\beta} \left( T_S \frac{\sin\frac{\Delta\omega}{2} T_S}{\frac{\Delta\omega}{2} T_S} e^{j\frac{\Delta\omega}{2} T_S} \right)^2 \tag{29}$$

$$= (\beta - \alpha + 1) \left( T_S \sin\Delta \frac{\frac{\omega}{2} T_S}{\frac{\Delta\omega}{2} T_S} \right)^2 e^{j\Delta\omega T_S}$$

Then the frequency deviation $\Delta\omega$ can be detected and corrected according to the phase corresponded with the value.

It is thus possible to reduce the amount of operation by limiting received data in the frequency domain used in operation. Although the method of limiting the range of data has been explained herein, another limiting method may be used, such as of extracting data at some intervals.

While the invention has been described in detail, the foregoing description is in all aspects illustrative and not restrictive. It is understood that numerous other modifications and variations can be devised without departing from the scope of the invention.

We claim:

1. A digital broadcasting receiver for receiving a digital broadcast transmitted by an orthogonal frequency division multiplexing OFDM transmission system in which each of a plurality of carriers is phase-modulated, comprising:

FFT processing means for converting an OFDM signal expressed in the time domain into demodulation data expressed in the frequency domain; and frequency deviation detecting means for detecting a phase error for each of the plurality of carriers by first multiplying, for each element, a demodulation data vector of phase reference symbols with a defined complex conjugate vector of the phase reference symbols, then multiplying elements in a vector obtained by the first multiplication which are equally separated from a center element at a particular carrier frequency, and adding the results of the latter multiplication;

wherein solutions obtained by said frequency deviation detecting means for a correspondence in a particular relation between said demodulation data vector of phase reference symbols and said defined complex conjugate vector of phase reference symbols and correspondence in which elements of said demodulation data vector of phase reference symbols and of said defined complex conjugate vector of phase reference symbols are mutually shifted from said particular relation by a plurality of elements, a correspondence which provides a maximum absolute value is obtained, and synchronization control is provided based on a difference of an obtained correspondence from said particular relation and said carrier frequency for said center element.

2. The digital broadcasting receiver according to claim 1, wherein said frequency deviation detecting means includes, phase correcting means for multiplying, for each element, said demodulation data vector of phase reference symbols with said defined complex conjugate vector of phase reference symbols, and product-sum operation means for multiplying elements equally separated from said center element at said particular carrier frequency in the output vector of said phase correcting means and adding the multiplication results.

3. The digital broadcasting receiver according to claim 1, further comprising:

integrating means for multiplying elements equally separated from a center element at a particular carrier frequency in the demodulation data vector of phase reference symbols, phase correcting means for multiplying, for each element, a vector result of said integrating means with each of vectors obtained by multiplying elements equally separated from said center element at said particular carrier frequency and elements separated by a plurality of elements from said element at said particular carrier frequency in said defined complex conjugate vector of phase reference symbols, and adding means for adding the results of said phase correcting means.

4. The digital broadcasting receiver according to claim 2, further comprising:

carrier shift means for shifting a correspondence between elements of said demodulation data vector and carrier frequencies, wherein said phase correcting means and said product-sum operation means function when said correspondence between said demodulation data vector of phase reference symbols and said defined complex conjugate vector of phase reference symbols has a particular relation, and when elements of said demodulation data vector of phase reference symbols and of said defined complex conjugate vector of phase reference symbols are mutually shifted from said particular relation by a plurality of elements, a correspondence which provides a maximum absolute value is obtained, and said carrier shift means shifts said demodulation data vector based on said difference of said obtained correspondence from said particular relation and said carrier frequency for said element used as said center in said product-sum operation means.

5. The digital broadcasting receiver according to claim 2, wherein said synchronization control is further based on a phase given by the product-sum operation result which maximizes said absolute value.

6. The digital broadcasting receiver according to claim 5, further comprising;

carrier shift means for shifting a correspondence between elements of said demodulation data vector and carrier frequencies, wherein said phase correcting means and said product-sum operation means operate when said correspondence between said demodulation data vector of phase reference symbols and said defined complex conjugate vector of phase reference has a particular relation, and when elements of said demodulation data vector of phase reference symbols and of said defined complex conjugate vector of phase reference symbols are mutually shifted from said particular relation by a plurality of elements, a correspondence which provides a maximum absolute value is obtained, and said carrier shift means shifts said vector based on a difference of said obtained correspondence from said particular relation and said carrier frequency for said element used as said center in said product-sum operation means.

7. The digital broadcasting receiver according to claim 1, further comprising;
   differential demodulation means for obtaining, for each carrier, a phase difference between demodulation data output by said FFT processing means and the preceding demodulation data, and
   phase error detecting means for multiplying a result of differential demodulation of said each carrier output by said differential demodulation means by itself a number of times corresponding to the number of phases of phase modulation on a transmitting side, and obtaining the average,
   wherein said synchronization control is further based on an output of said phase error detecting means.

8. The digital broadcasting receiver according to claim 1, wherein said frequency deviation detecting means obtains vectors by first multiplying, for each element, said demodulation data vector of phase reference symbols by said defined complex conjugate vector of phase reference symbols, then multiplying elements in said vectors obtained by the first multiplication which are equally separated from a center element corresponding to a band of baseband frequency of zero of said OFDM signal, adding the results of the latter multiplication and obtaining a correspondence which provides a maximum absolute value of said adding solutions.

9. The digital broadcasting receiver according to claim 1, wherein said frequency deviation detecting means uses limited components of said demodulation data vector of phase reference symbols and said defined complex conjugate vector of phase reference symbols.

10. A digital broadcasting receiver for receiving a digital broadcast transmitted by an orthogonal frequency division multiplexing OFDM transmission system in which each of a plurality of carriers is phase-modulated, comprising:
    symbol selecting means for partitioning a received digital signal represented in the time domain into symbols;
    region converting means for obtaining demodulation data represented in the frequency domain based on said symbols partitioned by said symbol selecting means;
    phase correcting means for multiplying, for each element, a demodulation data vector of phase reference symbols by a defined complex conjugate vector of phase reference symbols;
    inverse FFT processing means for applying inverse FFT processing to an output of said phase correcting means;
    timing variation detecting means for detecting a peak result of said inverse FFT processing means and detecting a timing shift at which said symbol selecting means partitions symbols according to a position of said peak;
    timing control means for controlling timing at which said symbol selecting means partitions symbols according to a timing shift detected by said timing variation detecting means; and
    product-sum operation means for multiplying elements equally separated from a center element at a particular carrier frequency in an output vector of said phase correcting means and adding the results;
    wherein said phase correcting means provides, to said inverse FFT processing means, an output based on a correspondence between said demodulation data vector of phase reference symbols and said defined complex conjugate vector of phase reference symbols which provides a maximum absolute value solution of the solutions provided by said phase correcting means and said product-sum operation means for a correspondence in a particular relation, and correspondences in which elements of said demodulation data vector of phase reference symbols and of said defined complex conjugate vector of phase reference symbols are mutually shifted from said particular relation by a plurality of elements.

11. The digital broadcasting receiver according to claim 10, wherein said phase correcting means and said product-sum operation means operate when a correspondence between said demodulation data vector of phase reference symbols and said defined complex conjugate vector of phase reference symbols has a particular relation, and when said elements of said demodulation data vector of phase reference symbols and of said defined complex conjugate vector of phase reference symbols are shifted from said particular relation by a plurality of elements, a correspondence which provides a maximum absolute value result is obtained, and synchronization control to said broadcasting frequency is provided based on a difference of an obtained correspondence from said particular relation and said carrier frequency for said element used as said center in said product-sum operation means.

12. The digital broadcasting receiver according to claim 11, wherein said synchronization control is achieved in accordance with the phase given by a result of the product-sum operation which maximizes said absolute value.

13. The digital broadcasting receiver according to claim 10, further comprising;
    differential demodulation means for obtaining, for each carrier, a phase difference between demodulation data output by said region converting means and demodulation data immediately preceding said demodulation data, and
    phase error detecting means for multiplying a result of differential demodulation for said each carrier output by said differential demodulation means by itself a number of times corresponding to the number of phase modulation phases on a transmitting side, and obtaining the average,
    wherein said synchronization control is based on an output of said phase error detecting means.

14. The digital broadcasting receiver according to claim 10, further comprising:
    carrier shift means for shifting a correspondence between elements of said demodulation data vector and carrier frequencies,
    wherein said phase correcting means and said product-sum operation means function when a correspondence between said demodulation data vector of phase reference symbols and said defined complex conjugate vector of phase reference symbols has a particular relation, and when said elements of said demodulation data vector of phase reference symbol and said defined complex conjugate vector of phase reference symbols are mutually shifted from said particular relation by a plurality of elements, a correspondence which provides a maximum absolute value result is, and said carrier shift means shifts said demodulation data vector based on a difference of said obtained correspondence from said particular relation and said carrier frequency for said center element.

15. The digital broadcasting receiver according to claim 10, wherein said phase correcting means multiples, for each element, said demodulation data vector of phase reference symbols by said defined complex conjugate vector of phase reference symbols, and said product-sum operation means multiplies elements in an output vector from said phase correcting means equally separated from an element corresponding to a band of baseband frequency of zero of said OFDM signal and adds the results.

16. The digital broadcasting receiver according to claim 10, wherein said phase correcting means and said product-sum operation means use limited parts of said demodulation data vector of phase reference symbols and said defined complex conjugate vector of phase reference symbols.

17. A digital broadcasting receiver for receiving a digital broadcast transmitted by an orthogonal frequency division multiplexing OFDM transmission system in which each of a plurality of carriers is phase-modulated, comprising:

FFT processing means for converting a received OFDM signal expressed in the time domain into demodulation data expressed in the frequency domain;

phase correcting means for multiplying, for each element, a demodulation data vector of phase reference symbols output by said FFT processing means by a defined complex conjugate vector of phase reference symbols;

product-sum operation means for multiplying elements equally separated from a center element at a particular carrier frequency in an output vector of said phase correcting means, and adding the results of multiplication;

carrier shift means for shifting correspondence between elements of said demodulation data vector and carrier frequencies; and control means for controlling said carrier shift means, wherein said phase correcting means and said product-sum operation means function when a correspondence between said demodulation data vector of phase reference symbols and said defined complex conjugate vector of phase reference symbols has a particular relation, and when elements of said demodulation data vector of phase reference symbols and defined complex conjugate vector of phase reference symbols are mutually shifted from the particular relation by a plurality of elements, a correspondence which provides a maximum absolute value result is obtained, and said control means controls said carrier shift means based on a difference of an obtained correspondence from said particular relation and said carrier frequency for said center element.

18. The digital broadcasting receiver according to claim 17, wherein said control means also provides synchronization control based on said carrier frequency for said element used as said center.

19. The digital broadcasting receiver according to claim 18, wherein said synchronization control is also based on a phase given by the product-sum operation result which maximizes said absolute value.

* * * * *